(12) United States Patent
Takasugi et al.

(10) Patent No.: US 6,837,438 B1
(45) Date of Patent: Jan. 4, 2005

(54) NON-CONTACT INFORMATION MEDIUM AND COMMUNICATION SYSTEM UTILIZING THE SAME

(75) Inventors: Wasao Takasugi, Higashiyamato (JP); Fumiyuki Inose, Tokorozawa (JP)

(73) Assignee: Hitachi Maxell, Ltd., Osaka (JP)

( * ) Notice: Subject to any disclaimer, the term of this patent is extended or adjusted under 35 U.S.C. 154(b) by 0 days.

(21) Appl. No.: 09/430,186

(22) Filed: Oct. 29, 1999

(30) Foreign Application Priority Data

Oct. 30, 1998 (JP) .......................................... 10-324423
Jan. 26, 1999 (JP) .......................................... 11-017189

(51) Int. Cl.$^7$ .............................................. G06K 19/06
(52) U.S. Cl. ...................................................... 235/492
(58) Field of Search ................................. 235/380, 487, 235/488, 492, 449; 257/679; 343/700, 866, 873, 895

(56) References Cited

U.S. PATENT DOCUMENTS 5,436,441 A * 7/1995 Inoue .......................... 235/492
5,856,662 A * 1/1999 Kohama et al. ............. 235/492
6,126,077 A * 10/2000 Tanaka et al. ............... 235/492
6,152,373 A * 11/2000 Roberts et al. .............. 235/492
6,378,774 B1 * 4/2002 Emori et al. ................. 235/492

FOREIGN PATENT DOCUMENTS

| EP | 1031939 A1 | * | 8/2000 | |
| JP | 10107708 A | * | 4/1998 | ............ H04B/5/00 |
| JP | WO 9926195 A | * | 5/1999 | |

* cited by examiner

*Primary Examiner*—Diane I. Lee
(74) *Attorney, Agent, or Firm*—Birch, Stewart, Kolasch & Birch, LLP

(57) ABSTRACT

In a non-contact IC (integrated circuit) module having an IC chip and a coil, the non-contact IC module communicates with a terminal via a booster unit. A communication system extends a communication distance of data modulated by using a carrier frequency (sub-carrier frequency). A communication auxiliary apparatus is used in a communication between a non-contact information medium and an external appliance.

9 Claims, 18 Drawing Sheets

NON-CONTACT INFORMATION MEDIUM AND COMMUNICATION SYSTEM UTILIZING THE SAME

BACKGROUND OF THE INVENTION

The present invention generally relates to a data recording carrier, and more specifically, is directed to a non-contact information medium containing an IC chip. A non-contact information medium containing an IC chip "implies such a medium that an IC chip is provided as an information recording medium, and this information recording medium communicates with an external device in a non-contact manner. As a result, if such an information medium is a non-contact type medium, then there is no limitation in wavelengths of electromagnetic waves, but also no limitation in communication distances. As a consequence, a non-contact IC module (will be discussed later), and a solid member containing such a non-contact IC module are equal to a "non-contact information medium".

Also, the present invention generally relates to a communication system, and more particularly, is directed to a data communication system utilizing a non-contact information medium. A "non-contact information medium" is such a medium equipped with an information recording module such as an IC chip and communicated with an external device such as a reader/writer in a non-contact manner. As a result, if such an information medium is a non-contact type medium, then there is no limitation in wavelengths of electromagnetic waves, but also no limitation in communication distances.

A typical non-contact information containing an IC chip is known as such a non-contact IC card capable of communicating with a reader/writer by using microwaves. It should be understood in the present specification that an expression "IC card" may totally involve a smart card, an intelligent card, a chip-in card, a microcircuit (microcomputer) card, a memory card, a super card, a multi-function card, a combination card, and the like.

Also, a shape of such a non-contact information medium containing an IC chip is not limited to a shape of a card. As a result, this non-contact information medium may involve a so-called "IC tag". In this case, a so-termed "IC tag" owns a similar function to that of an IC card. This IC tag may involve all of information recording media having various sizes equal to sizes of stamps and also smaller than the stamp sizes, namely ultra-small sizes, and further having various shapes such as coins.

On the other hand, an IC card is classified into either a contact type IC card or a non-contact type IC card in accordance with a communication method executed between an IC chip build in an IC card and a reader/writer. Among them, a non-contact IC card may have the following features. That is, since this non-contact type IC card owns no contact used with the reader/writer, no loose contact will occur. This non-contact IC card may be used at a remote placer from the reader/writer by several cm to several tens cm. The non-contact IC card may be protected from soil, rain, and electrostatic energy. Accordingly, higher needs of such a non-contact IC card will be expected.

A non-contact IC card may obtain operating electric power from an electromagnetic wave received from a reader/writer by way of an electromagnetic induction, and also may exchange data with respect to the reader/writer by utilizing electromagnetic wave. Normally, in a non-contact IC card, while an antenna (for example, antenna coil) used to transmit/receive such an electromagnetic wave is formed as a separate member from an IC chip, this formed antenna is connected to the IC chip.

As explained above, since the antenna and the IC chip are formed in the independent members, when the conventional non-contact IC card is packaged, or mounted, both the antenna and the IC chip are required to be electrically connected to each other. However, the electric connection between the terminals of such a very small IC chip and the antenna would cause technical difficulties. Further, when a flexible IC card is used, stress is especially applied to a connecting point, which may cause disconnection of the electric connection. Also, since a board for holding the IC chip and the antenna is required, this board may cause manufacturing cost to be increased. In addition, since checking of the electric connection and also confirming of the operation of the IC chip cannot be carried out unless both the IC chip and the antenna are mounted and connected to each other, the manufacturing sufficiency would be lowered.

On the other hand, to accept such a request for making constructive elements compact and for establishing multi-functions, an on-chip coil system may be conceived in which an antenna coil is build in an IC chip. This IC chip may have such a merit that there is a less problem in packaging, and this on-chip coil system may contribute compactness of these constructive elements.

However, since the antenna of the non-contact information medium is made compact, the communicatable region thereof is necessarily decreased, and there is a limitation in the applicable range, as compared with that of the conventional IC card equipped with the card-sized antenna, which is externally provided with the IC card.

Also, to supply electric power from a reader/writer to a card and also to transfer data from the reader/writer to the card, such a high frequency (radio frequency) carrier signal of a frequency "$f_c$" (for example, $f_c$=several hundreds kHz to several tens MHz) is employed. On the other hand, to transfer data from a card to a reader/writer, the above-explained carrier frequency may be directly utilized. Alternatively, a sub-carrier frequency "$f_{sc}$" is modulated by the sub-carrier frequency "$f_{sc}$" (for instance, $f_{sc}$=1/16 to 32 fc) which is sufficiently lower than "$f_c$" in order to improve S/N (signal to noise) and reliability of communications.

Also, to establish the wireless communication between the conventional non-contact IC card and the reader/writer, the antenna (for example, antenna coil) of this non-contact IC card is required to be arranged in such a condition that the antenna (for instance, antenna coil) of this non-contact IC card is positioned in parallel to and also just above the antenna (for example, antenna coil) of the reader/writer. For instance, even when the non-contact IC card is located just above the reader/writer, if the antenna coil of the non-contact IC card is inclined with respect to the normal direction of the antenna coil of the reader/writer, then the communication distance would be shortened in accordance with the inclination angle due to the antenna directivity. When the normal direction of the antenna coil of the non-contact IC card is positioned perpendicular to that of the antenna coil of the reader/writer, no longer the communication can be established between the non-contact IC card and the reader/writer.

Furthermore, in such a case that the non-contact IC card is separated from the position just above the antenna of the reader/writer, the non-contact IC card can communicate with the reader/writer, because of the antenna directivity. After all, the communicatable region is limited only to such a predetermined area located just above the antenna of the reader/writer.

As previously explained, while the conventional non-contact IC card communicates with the reader/writer, there are various restrictions, namely restriction in antenna inclination angle caused by antenna directivity, restriction in communicatable area, and restriction in communication distance. Also, since the users of the non-contact IC cards cannot visually observe the communicatable areas, operatabilities of these card users are deteriorated and these card users cannot quickly read out.

SUMMARY OF THE INVENTION

A major object of the present invention is to provide a novel and useful non-contact information medium capable of solving such conventional problems.

More specifically, the present invention has such an object to provide a non-contact information medium provided with a feature of a coil-on chip system, and capable of extending a communication distance by way of a simple manner.

Also, the present invention has another object to provide a non-contact information medium with a high manufacturing efficiency.

Also, the present invention has a further object to provide a method for manufacturing a non-contact information medium, by which a wireless-communicatable non-contact IC module can be manufactured without additionally employing any novel step in the step for manufacturing the normal IC chip, while the conventional IC chip manufacturing apparatus is directly utilized. In this case, generally speaking, an expression "non-contact IC module" implies that an IC chip is coupled to a coil, an antenna, and the like corresponding to a non-contact communication means for communicating between the IC chip and an external apparatus (external appliance). This non-contact IC module may involve all of such IC modules as an on-coil IC chip having a monolithic IC structure, and an IC module in which an IC chip and a coil are mounted on an IC surface, or the same board in an integral form. It should also be noted that although no limitation is made in a communication means of such a non-contact IC module in a wide sense, the non-contact IC module may communicate via electromagnetic waves in this present patent application.

To achieve the above-described objects, a non-contact information medium, according to the present invention, is featured by comprising: a booster unit having a first coil, capable of wireless-communicating with an external apparatus by utilizing an electromagnetic induction; and a non-contact IC (integrated circuit) module capable of wireless-communicating with the booster unit in a non-contact manner in such a way that the non-contact IC module is electromagnetically coupled to the booster unit in a non-contact manner; and in which the non-contact IC module is comprised of: an IC element; and a second coil connected to the IC chip, capable of producing an induction current from such a induction current produced in the first coil by the external apparatus by way of the electromagnetic induction. The second coil is smaller than the first coil.

Also, a non-contact information medium, according to the present invention, is featured by comprising: a booster unit including a first communication unit having a first communication distance and capable of wireless-communicating with an external apparatus; and a non-contact IC (integrated circuit) module capable of wireless-communicating with the booster unit; in which the non-contact IC module is comprised of: an IC chip; and a second communication unit connected to the IC chip, having a second communication distance shorter than the first communication distance, and capable of wireless-communicating with the first communication unit.

Also, a non-contact information medium, according to the present invention, is featured by comprising: a non-contact IC module; and a molded member having a predetermined shape, for protecting the non-contact IC module.

Also, a manufacturing method of a non-contact information medium, according to the present invention, is featured by comprising: a step for forming a non-contact IC module containing an IC chip and an antenna and capable of wireless-communicating; a step for forming a booster unit used to extend a communication distance of the non-contact IC module so as to thereby is capable of establishing a wireless communication between the non-contact IC module and an external apparatus; and a step for coupling the non-contact IC module to the booster unit in a non-contact manner; in which: the step for forming the non-contact IC module includes a wiring step for connecting structural elements of the IC element to each other. In this wiring step, both wiring of the IC chip and forming of the antenna are simultaneously carried out while using a mask which has a wiring pattern for the IC chip and a pattern for the antenna.

Also, a method for manufacturing a wireless-communicatable non-contact IC module, according to the present invention, is featured by comprising: a step for forming a gate in a standard MOS semiconductor manufacturing step; a step for forming both a source and a drain; and a step for wiring said gate, source, and drain, and further structural elements among other circuit elements, in which in this wiring step, both wiring of the IC chip and forming of the antenna are simultaneously carried out while using a mask which has a wiring pattern for the IC chip and a pattern for the antenna.

Also, a checking system, according to the present invention, is featured by comprising: a non-contact probe antenna capable of communicating with a non-contact IC module in a non-contact manner; and a checking apparatus connected to the non-contact probe antenna, in which the non-contact probe antenna checks the non-contact IC module in response to a signal received from the non-contact IC module.

Also, a method for manufacturing a non-contact information medium, according to the present invention, is featured by comprising: a step for communicating with a non-contact IC module by employing a non-contact probe antenna; a step in which the non-contact probe antenna checks the non-contact IC module in response to a signal received from the non-contact IC module; and a step for mounting on a base member, only the non-contact IC module which could satisfy a predetermined requirement in the checking step.

In accordance with the non-contact information medium of the present invention, the non-contact IC module can essentially communicate with the external apparatus via the booster unit. As a consequence, under such a condition that the booster unit can communicate with the external apparatus and also the non-contact module can communicate with the booster unit, the non-contact IC module no longer requires such a long communication distance over which this non-contact IC module can directly communicate with the external apparatus. Also, the non-contact information medium may be formed as a molded member.

Also, in accordance with the method for manufacturing the non-contact information medium and also the method for manufacturing the wireless-communicatable non-contact IC module, the above-explained antenna can be manufactured with the non-contact information medium and the wireless-communicatable non-contact IC module at the same time by way of the normal semiconductor manufacturing process for manufacturing the IC chip and the package thereof, more specifically, by utilizing the rewired line layer in the manufacturing method called as a "CSP (chip scale package)."

Also, the checking system of the present invention can check the non-contact IC module in the non-contact manner even under wafer state. Furthermore, the manufacturing method of the non-contact information medium according to the present invention may use this non-contact checking method.

Furthermore, a major object of the present invention is to provide a novel and useful communication system as well as a novel and useful communication auxiliary apparatus used in this communication system, capable of solving the conventional problems.

More specifically, an object of the present invention is to provide a communication system and also a communication auxiliary apparatus used in this communication system, capable of extending a communication distance, while securing a communication reliability level similar to, or higher than the conventional communication reliability level.

Also, another object of the present invention is to provide a communication system and a communication auxiliary apparatus used in the communication system, capable of achieving power saving of operating electric power, as compared with the prior art power saving.

A further object of the present invention is to provide such a communication system and a communication auxiliary apparatus used in this communication system, capable of simply mitigating a restriction in a communication area, a restriction in a communication distance, and also a restriction in an inclination angle caused by antenna directivity between a non-contact information medium and an external apparatus.

To achieve these objects, a communication system, according to a first aspect of the present invention, is featured by comprising: a non-contact information medium; an external apparatus capable of communicating with the non-contact information medium by utilizing a carrier having a first frequency $f_c$ as a carrier frequency; and a communication auxiliary apparatus electromagnetically coupled to the external apparatus, and capable of emphasizing a second frequency $f_{sc}$ produced by utilizing the first frequency $f_c$, the second frequency $f_{sc}$ being different from the first frequency $f_c$.

Also, a communication system, according to a second aspect of the present invention, is featured by comprising: a non-contact information medium; an external apparatus capable of communicating with the non-contact information medium by utilizing a carrier having a first frequency $f_c$ as a carrier frequency; and a first communication auxiliary apparatus electromagnetically coupled to the external apparatus, capable of emphasizing the first frequency $f_c$; and a second communication auxiliary apparatus electromagnetically coupled to the external apparatus, capable of emphasizing the second frequency $f_{sc}$.

Also, a communication auxiliary apparatus, according to the present invention, is featured by comprising: a base member; and a communication unit coupled to the base member and electromagnetically coupled to the external apparatus, the communication unit being capable of emphasizing a second frequency $f_{sc}$ different from a first frequency $f_c$ in such a case that an external apparatus is capable of communicating with a non-contact information medium by utilizing a carrier having a first frequency $f_c$ as a carrier frequency, the second frequency $f_{sc}$ being produced by using the first frequency $f_c$.

In accordance with both the communication system and the communication auxiliary apparatus of one aspect of the present invention, the non-contact information medium directly communicates with the external apparatus, or wireless-communicates with the external apparatus via the communication auxiliary apparatus. The communication auxiliary apparatus can emphasize the first frequency and/or the second frequency so as to auxiliary support the communication executed between the non-contact information medium and the external apparatus.

In the communication system according to one aspect of the present invention, when the communication executed between the non-contact information medium and the external apparatus is relayed, or repeated, the communication auxiliary apparatus merely emphasizes the frequency, but does not change this frequency. If the normal direction of the antenna of the communication apparatus is made coincident with the normal direction of the antenna of the external apparatus, then the communicatable distance of the external apparatus is extended. If the normal direction of the antenna of the communication apparatus is inclined with respect to the normal direction of the antenna of the external apparatus, then the tiltable angle of the non-contact information medium is increased with respect to the external apparatus. The communication auxiliary apparatus owns more than one resonant circuit. The respective resonant circuits can be resonated at the second frequency. Selectively, the amplifier may be provided with the communication auxiliary apparatus to amplify the electromagnetic wave used in the wireless communication.

Other objects and further features of the present invention will become apparent from embodiments explained with reference to the accompanying drawings.

DESCRIPTION OF THE EMBODIMENTS

Figure 1:
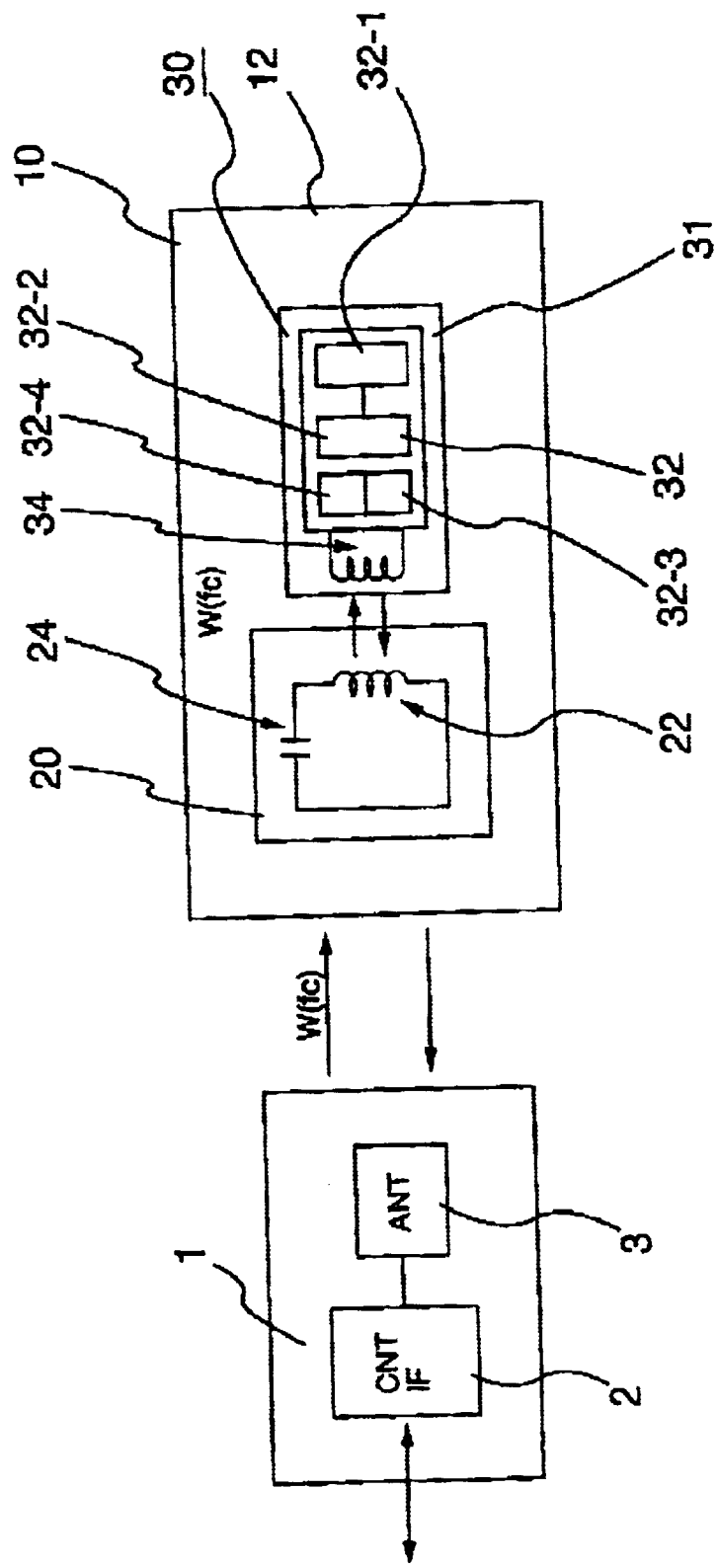
FIG. 1 is a block diagram for showing a relationship between a structure of a non-contact information medium 10 of the present invention, and a reader/writer 1.

Referring now to drawings, a non-contact information medium of the present invention will be described. It should be noted that in the respective drawings, members, or components to which the same reference numerals are applied indicate the same members, or components, members, or components to which alphabets are given to the same reference numbers indicate modified members, or components corresponding thereto, and therefore, the same descriptions thereof are omitted. Also, a reference numeral involves all of the same reference numerals attached with alphabets.

First, a non-contact information medium 10 of the present invention will now be explained with reference to FIG. 1 to FIG. 5. FIG. 1 is a block diagram for indicating a relationship between the structure of the non-contact information medium 10 according to the present invention and a reader/writer 1.

The non-contact information medium 10 of the present invention communicates with the reader/writer (R/W) 1 corresponding to an external appliance (device) by using electromagnetic waves. The non-contact information medium 10 may contain a battery. However, it is preferable to construct this non-contact information medium 10 as a batteryless type medium in order to avoid such a trouble caused by deterioration of the built-in battery, and also in order to make a chip compact. As a result, it is now assumed that the non-contact information medium 10 transmits/receives data to/from the reader/writer 1 by utilizing electromagnetic waves, and may obtain operating electric power from the electromagnetic waves received from the reader/writer 1 by way of electromagnetic induction. Also, the non-contact information medium 10 may have an arbitrary shape (for example, pendant shape, coin shape, key shape, card shape, tag shape, and the like) to be fitted to its usage.

As previously explained, although the non-contact information medium 10 of the present invention may communicate with the external appliance in such a non-contact wireless manner, the present invention never excludes such a function that the non-contact information medium 10 is made contact with the external appliance so as to communicate with this external appliance. For instance, the non-contact information medium 10 may be arranged as a combination card having both functions of a contact IC card as well as a non-contact IC card in combination with a non-contact IC module 30 (will be explained more in detail), since a contact IC chip is built in this non-contact information medium 10.

Also, the present invention is not limited to such a case that the non-contact information medium 10 is applied to a card medium having a magnetic stripe. In this case, the non-contact information medium 10 may own a function as a magnetic card such as a credit card and a cash card. Furthermore, embossment, a sign panel, a hologram, a seal, a hot stamp, an image print, a photograph and the like may be selectively formed on the non-contact information medium 10.

On the other hand, the reader/writer 1 owns a control interface unit (CNT IF) 2 and an antenna unit (ANT) 3. The reader/writer 1 transmits/receives an electromagnetic wave W having a predetermined carrier frequency $f_c$ to /from the non-contact information medium 10 so as to communicate with the non-contact information medium 10 by utilizing a wireless (radio) communication. It should also be noted that the electromagnetic wave W may use such a carrier frequency $f_c$ within an arbitrary frequency range. The reader/writer 1 may be arranged as, for instance, a reader/writer used to a non-contact IC card, and is connected via the control interface unit 2 to a further external appliance (processing apparatus, control apparatus, personal computer, display and the like, not shown in this drawing).

The control interface unit 2 is connected to the antenna unit 3 which is arranged by, for example, an antenna coil, and also contains both a modulating circuit and a demodulating circuit. The modulating circuit converts data supplied from the external appliance into a transmission signal by changing, for example, an amplitude of a carrier frequency (namely ASK modulating system), and then transmits this transmission signal to the antenna unit 3. Also, the demodulating circuit converts the signal which is received via the antenna unit 3 from the non-contact information medium 10 into a baseband signal so as to acquire data. Then, this demodulating circuit transmits the resultant data to the external appliance (not shown). It should also be noted that since both the modulating circuit and the demodulating circuit may be realized by employing circuits well known in this technical field, detailed descriptions thereof are omitted.

The non-contact information medium 10 contains a booster unit 20, and also a non-contact IC module 30 within a base member 12. The non-contact IC module 30 is capable of performing a wireless communicating operation, and is electromagnetically coupled to the booster unit 20. The base member 12 is made of, for example, a plastic material.

The booster unit 20 may receive the electromagnetic wave W from the reader/writer 1, and may transmit this received electromagnetic wave W to the non-contact IC module 30. Also, this booster unit 20 may receives the electromagnetic wave W from the non-contact IC module 30, and may transmit this received electromagnetic wave W to the reader/writer 1. As a result, the booster unit 20 owns such a function as a relay unit provided between the reader/writer 1 and the non-contact IC module 30. As will be explained later, the boaster unit 20 utilizes the electromagnetic induction between the reader/writer 1 and the non-contact information medium 10. This booster unit 20 may employ any of arbitrary arrangements if such a function can be achieved.

Referring now to FIG. 1, an example of an arrangement of the booster unit 20 will be explained. As indicated in this drawing, the booster unit 20 contains at least one antenna coil 22, and preferably a capacitor 24.

The electromagnetic wave W received by the reader/writer 1 produces an induction current in the antenna coil 22 as a change in magnetic flux. This induction current produces an induction current in a coil 34 of the non-contact IC module 30 (will be explained later) which is electromagenetically coupled to the coil 22. Also, the coil 22 produces the electromagenetic wave W from the induction current induced by a change in the currents flowing through the coil 34, and then may transmit this produced electromagnetic wave W to the reader/writer 1.

As described above, the coil 22 functions as a communication unit capable of communicating with both the reader/writer 1 and the non-contact IC module in the booster unit 20. The coil 22 owns a predetermined communication distance capable of communicating with the reader/writer 1. Since the dimension of this coil 22 is adjustable, this predetermined communication distance can be adjusted, if required. As a result, in such a case that the non-contact information medium 10 of the present invention is applied as a substitution of the conventional non-contact IC card, the above-explained predetermined communication distance may be set to a distance substantially equal to the communication distance required for the conventional non-contact IC card. For instance, if the communication distance is set to be on the order of 10 mm, then the dimension of the coil 22 is made small. If the communication distance is set to be on the order of several cm, then the dimension of the coil 22 is made medium. If the communication distance is set to be longer than, or equal to 10 cm, then the dimension of the coil 22 is made large.

The coil 22 may be constructed as a spiral plane coil and a multi-spiral coil, corresponding to an air-core coil. Also, the coil 22 may be arranged as a plane coil equipped with a ferrite core, or a ferrite bar antenna.

Figure 2:
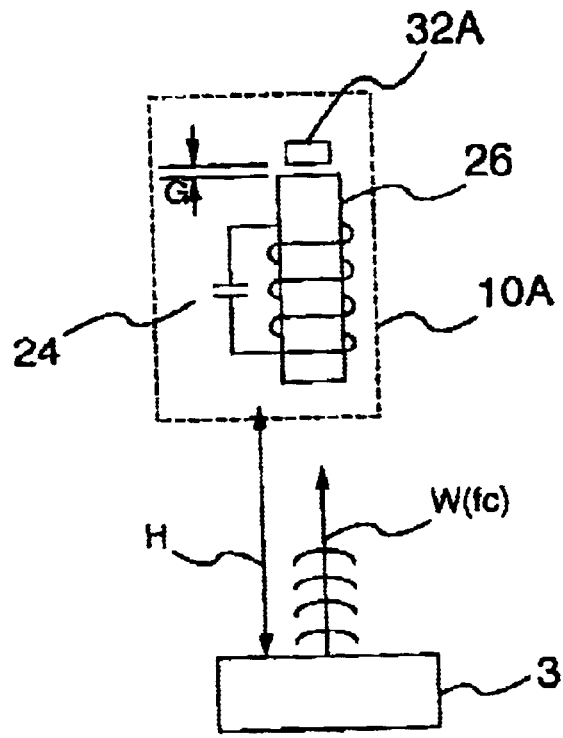
FIG. 2 is a block diagram for indicating a structure of a non-contact information medium 10A of another embodiment of the present invention.
Figure 3:
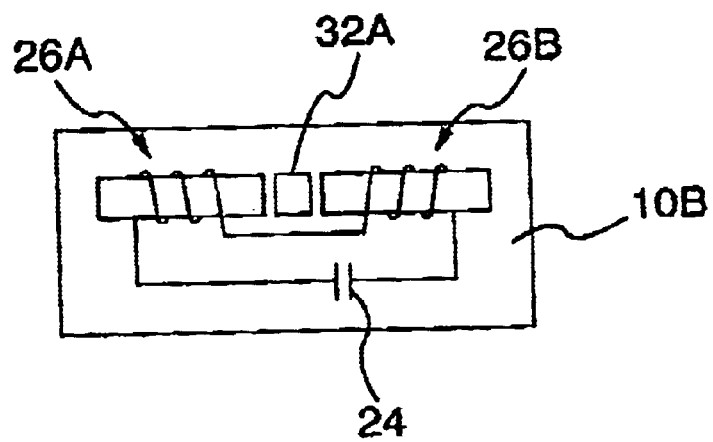
FIG. 3 is a block diagram for indicating a structure of a non-contact information medium 10C of a further embodiment of the present invention.

FIG. 2 shows a non-contact information medium 10A in which the coil 22 is constructed as a ferrite bar antenna coil 26. The shape of this ferrite bar antenna coil 26 is not limited to such a shape shown in this drawing, but may employ any arbitrary shapes such as a round shape, a rectangular shape, and a plate shape. FIG. 3 shows another non-contact information medium 10B in which the coil 22 is arranged as two sets of ferrite bar antenna coils 26A and 26B. It should be noted that FIG. 2 and FIG. 3 will be later explained more in detail.

The coil 22 may be manufactured by employing any of the manufacturing methods well known in this technical field, for example, the etching method with employment of copper and aluminum, the printing method by print wiring method, and the forming method by wire.

If the booster unit 20 owns a predetermined communication distance capable of communicating with the reader/writer 1, then the structure of the antenna used as the communication unit of the booster unit 20 is not limited to that of the antenna coil 22. For example, the antennas well known in this technical field such as a dipole antenna, a monopole antenna, a loop antenna, a slot antenna, and a microstrip antenna may be applied. It can be understood that the coil 22 may conceptionally cover the communication means.

The booster unit 20 may further employ a capacitor 24. As will be discussed later, the capacitor 24 is useful to form a resonant circuit which is resonated at a carrier frequency of "$f_c$" in conjunction with the coil 22. The capacitor 24 may be formed at the same time with the coil 22. Alternatively, the capacitor 24 may be formed on a ceramic board (not shown) in an integrated form together with the coil 22.

Figure 4:
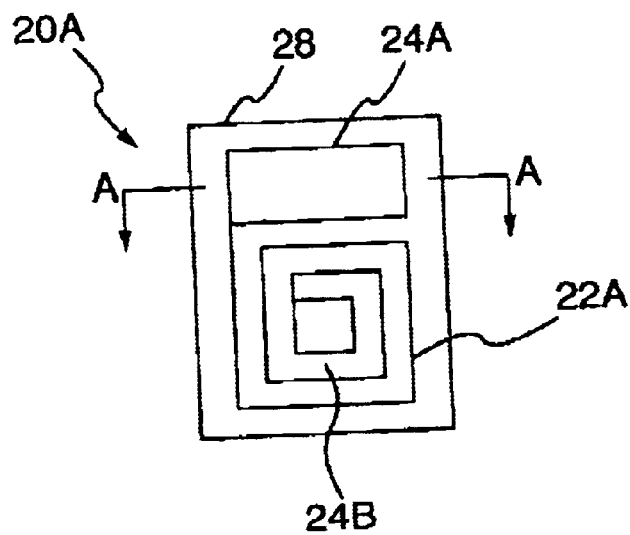
FIG. 4 is an upper plane view for showing an example of a concrete structure of a booster unit 20 shown in FIG. 1.
Figure 5:
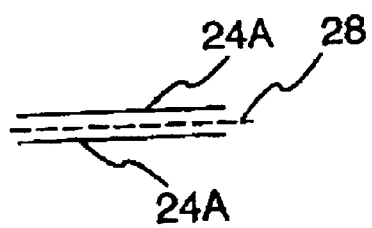
FIG. 5 is a sectional view for indicating the booster unit, taken along a line A-A of FIG. 4.
Figure 6:
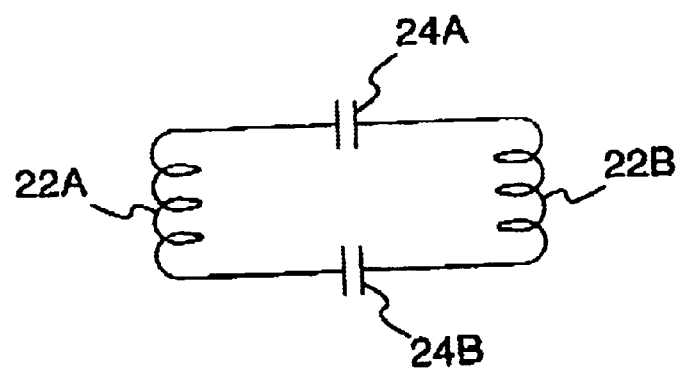
FIG. 6 is an equivalent circuit of the booster unit indicated in FIG. 4.
Figure 7:
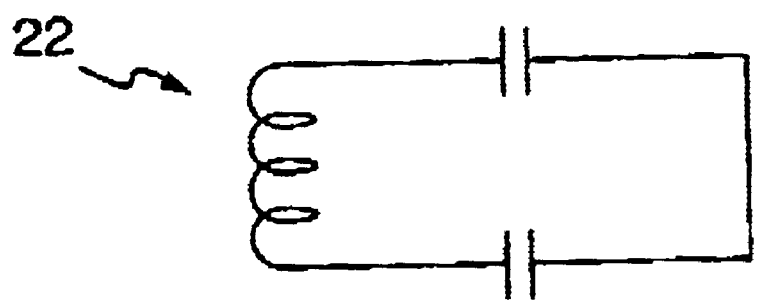
FIG. 7 is an equivalent circuit of an example of another concrete structure other than that of FIG. 4.

Referring now to FIG. 4 and FIG. 6, the booster unit 20A corresponding to an example of the concrete structure of the booster unit 20A shown in FIG. 1 will be described. In this case, FIG. 4 is an upper plane view for showing an example of a concrete structure of a booster unit 20 shown in FIG. 1. FIG. 5 is a sectional view for indicating the booster unit, taken along a line A-A of FIG. 4. FIG. 6 is an equivalent circuit of the booster unit indicated in FIG. 4. FIG. 7 is an equivalent circuit of an example of another concrete structure other than that of FIG. 4.

As indicated in FIG. 4, the booster unit 20A owns a thin dielectric film 28 having a thickness of, for example, several tens micrometers; one pair of capacitors 24A and 24B which are located opposite to each other by sandwiching the dielectric film 28; a coil 22A formed between the capacitors 24A and 24B only on one surface of the dielectric film 28; and a coil 22B formed between the capacitors 24A and 24B only on the other surface of the dielectric film 28. As indicated in FIG. 5, the coil 22A is positioned opposite to the coil 22B while sandwiching the dielectric film 28. Since the booster unit 20A employs the structure having such two capacitors 24A and 24B, this booster unit 20A may have such a merit that no longer the connection means such as a through hole is provided.

The dielectric film 28 is constituted by, for example, polyethylene, and PET (polyethylene telephthalate). Also, the capacitors 24A and 24B are constituted by, for instance, a copper plate. Furthermore, the coils 22A and 22B are formed by way of the etching method.

Next, in FIG. 6, there is shown an equivalent circuit of the structural elements indicated in FIG. 4. In this circuit, assuming now that a self-inductance of the coil 22A is "$L_1$" and a self-inductance of the coil 22B is "$L_2$", a combined self-inductance becomes ($L_1+L_2$). This combined self-inductance corresponds to a self-inductance of the coil 22 shown in FIG. 1. Similarly, assuming now that an electrostatic capacitance of the capacitor 24A is "$C_1$" and an electrostatic capacitance of the capacitor 24B is "$C_2$", a combined electrostatic capacitance "$C_r$" becomes [$C_1C_2/(C_1+C_2)$]. This combined electrostatic capacitance "$C_r$" corresponds to an electrostatic capacitance of the capacitor 24 indicated in FIG. 1.

Thus, a resonant frequency "$f_r$" of the equivalent circuit shown in FIG. 6 becomes $(\frac{1}{2}\pi)(L_rC_r)^{-1/2}$. For the sake of simplicity, assuming now that $L_1=L_2=L$, and $C_1=C_2=C$, the above-explained combined self-inductance becomes $L_r=2L$ and $C_r=C/2$, and also $f_r=(\frac{1}{2}\pi)(LC)^{-1/2}$. When these values are made coincident with the carrier frequency "$f_c$", the equivalent circuit shown in FIG. 6 is resonated at the frequency of $f_c$, and thus can supply large resonant currents to the capacitors 24A and 24B, and also the coils 22A and 22B. Also, this equivalent circuit can supply such a large resonant current to the non-contact IC module 30 in the non-contact manner.

It should also be noted that the circuit arrangement of the booster unit 20 is not apparently limited to that shown in FIG. 6. For instance, the booster unit 20 may employ such an equivalent circuit shown in FIG. 7. FIG. 7 shows an equivalent circuit of a booster unit 20B in which the coil 22B shown in FIG. 4 is replaced by a metal straight line and only a coil 22A (coil 22) is employed. As shown in this drawing, the coil 22B of FIG. 6 is replaced by a metal straight line, and the coil 22A constitutes a coil 22. It should be understood that if "$L_2$" is omitted, then a resonant frequency can be immediately calculated.

Selectively, a plurality of capacitors may be employed as a matching circuit instead of the capacitor 24 shown in FIG. 1. Also, a noise removing shield may be provided with the coil 22.

With reference to FIG. 1, in the non-contact IC module 30, a memory 32-1, a power supply circuit 32-3, a transmission reception circuit 32-4, an IC chip 32, and a coil 34 are mounted on a board 31. The transmission/reception circuit 32-4 contains a demodulating circuit and a modulating circuit. The IC chip 32 contains a clock (not shown), and logic control circuits 8 and 32-2.

Also, the IC chip 32 contains one pair of connecting terminals (not shown) with the coil 34. Alternatively, the IC chip 32 may be formed in an integral form together with the coil 34. This embodiment will be discussed later.

As previously explained, the non-contact IC module according to the present invention dose not contains a battery. The power supply circuit 32-3 may obtain the operating electric power thereof by using the electromagnetic induction from the electromagnetic wave W received by the coil 34. The demodulating circuit of the transmission/reception circuit 32-4 detects the received electromagnetic wave to restore this electromagnetic wave as a baseband signal and then reproduces data from the baseband signal. Also, the modulating circuit of the transmission/reception circuit 32-4 changes the carrier wave in response to the transmission data to thereby transmit the changed carrier wave to the coil 34. As the modulating system, for example, the ASK modulating system for changing the amplitude of the carrier frequency may be used.

Both the modulating circuit and the demodulating circuit are controlled by the logic control circuit 32-2 so as to be operated in synchronism with the clock. The memory 32-1 is constructed of a ROM, a RAM, an EEPROM, and/or an FRAM, capable of saving data. Since the structures and the operations of the structural elements provided in the non-contact IC module 30 are well known in this technical field, detailed descriptions thereof are omitted.

The IC chip 32 saves predetermined data into the memory 32-1. The IC chip 32 will communicate with the reader/writer 1 based upon this data, and the logic control circuit 32-2 is capable of performing a predetermined processing operation. For example, the memory 32-1 can store thereinto data about ID information, values and transaction records such as electronic money with a preselected amount, and other information. The logic control circuit can execute a process operation to increase/decrease values required in a predetermined transaction (for example, purchase of ticket, money deposition of electronic money).

The coil 34 is connected to the IC chip 32, and is electromagnetically coupled to the coil 22 in the non-contact manner. The coil 34 is arranged very close to the coil 22, or is positioned in the vicinity of the coil 22 by a very small gap.

In other words, the coupling condition between both the coils 34 and 22 is high density, and the coupling coefficient is approximated to 1.

The coil 34 may function as the communication unit in the non-contact IC module 30. While the coil 34 is arranged very close to the coil 22, a total length of these coils 22 and 34 is very short, as compared with the communication distance of the coil 22 of the booster unit 20. The arranging example of both the coils 34 and 22 will be explained. The coil 34 owns a desirable dimension, a desirable shape, a desirable self-inductance, and a desirable mutual-inductance, depending upon positioning between this coil 34 and the coil 22, the packaging area of this coil 34, and other conditions. For instance, as viewed from the upper direction, the shape of the coil is not limited to the circle shape, but may be selected from a rectangular shape, an elliptic shape, and the like.

Figure 9:
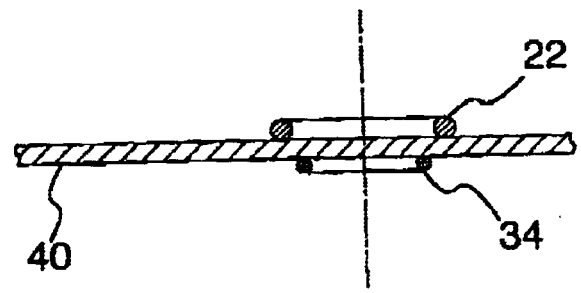
FIG. 9 is a sectional view for indicating two sets of coils and a positional relationship between these coils in the non-contact information medium 10 shown in FIG. 1.
Figure 10:
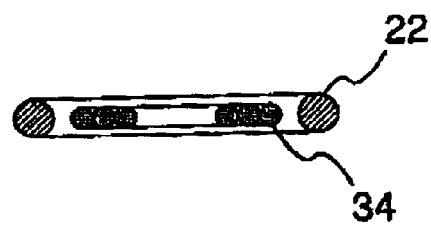
FIG. 10 is a sectional view for indicating another example of two sets of coils and a positional relationship between these coils in the non-contact information medium 10 shown in FIG. 1.
Figure 11:
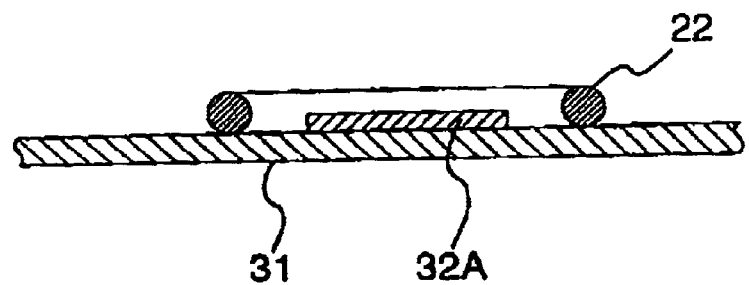
FIG. 11 is a sectional view for representing a further example of two sets of coils and a positional relationship between these coils in the non-contact information medium 10 shown in FIG. 1.
Figure 12:
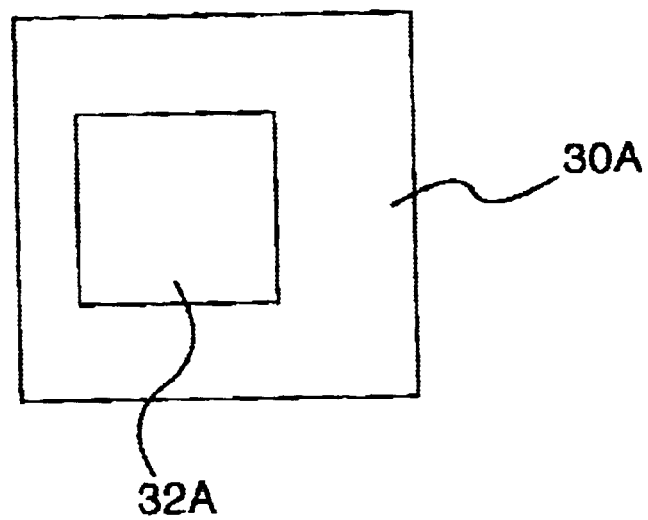
FIG. 12 is a block diagram for showing an on-coil IC chip applicable to a non-contact IC module of the non-contact information medium 10 indicated in FIG. 10.

Next, a positional relationship between the coil 34 (otherwise, on-coil IC chip 32A (will be discussed later)) and the coil 22 will now be explained with reference to FIG. 2, FIG. 3, and FIG. 9 to FIG. 11. Alternatively, it should be noted that the coil may be formed in a plane shape, but may be made in a three-dimensional manner. FIG. 9 to FIG. 11 are sectional views for showing different positional relationships between the coil 34 and the coil 22 from each other. For the sake of easy drawing illustrations, the coil 34 is indicated in an enlarged manner in FIG. 9 to FIG. 11. FIG. 12 indicates that the coil 34 is built in the IC chip 32. Since this built-in coil 34 is functionally similar to the coil 34 except that the dimension of the built-in coil 34 is made smaller than that of the coil 34, this built-in coil 34 will be explained in a similar manner to the coil 34.

FIG. 2 represents a relationship among an on-chip coil IC 32A, the coil 22 constituted as a ferrite bar antenna 26, and the antenna 3 of the reader/writer 1. As previously explained, preferably both the capacitor 24 and the ferrite bar antenna 26 constitute a resonant circuit resonated at a frequency of "$f_c$".

In FIG. 2, the magnetic flux produced from the electromagnetic wave W received from the antenna 3 is cross-connected to the ferrite bar antenna 26, whereas the magnetic flux produced from the ferrite bar antenna 26 is cross-connected to the chip-on coil IC 32A (namely, built-in coil, not shown). Also, a distance between the antenna 3 and the ferrite bar antenna 26 corresponds to communicatable distances of the antenna 3 and the ferrite bar antenna 26. A gap "G" between the ferrite bar antenna 26 and the chip-on coil 32A corresponds to a communicatable distance of the on-chip coil IC chip 32A. The gap "G" is very small with respect to the communication distance "H", and this gap "G" involves zero (namely, when on-chip coil IC 32A is close fitted to ferrite bar antenna 26). With employment of the structure of FIG. 2, although the communication distance of the on-chip coil IC 32A is the very small gap G, the communication distance thereof is essentially extended, so that the on-chip coil IC 32A can communicate with the reader/writer 1. In an actual use, the on-chip coil IC 32A, the capacitor 24, and the ferrite bar antenna 26 may be stored into one non-contact information medium 10A having an arbitrary shape, depending upon its usage.

FIG. 3 shows a non-contact information medium 10B corresponding to a modification of the non-contact information medium 10A indicated in FIG. 2. The coil 22 indicated in FIG. 1 is constructed of two sets of ferrite bar antennas 26A and 26B. Each of these ferrite bar antennas 26A/26B owns the same size and the same shape with each other. Each of the ferrite bar antennas 26A/26B corresponds to the ferrite bar antenna 26 shown in FIG. 2. As a result, since the magnetic flux cross-connected to the on-chip coil IC 32A, and the ferrite bar antennas 26A/26B is increased, as compared with the case of FIG. 2, the communication reliability can be improved.

It should also be noted that the ferrite bar antennas 26A and 26B may be constituted as independent resonant circuits.

Referring now to FIG. 9, both the coil 22 and the coil 34 are adhered on the respective surfaces of a supporting member 40, and center lines thereof are made coincident with each other. The supporting member 40 is made of a film having a thickness of on the order of 10 micrometers. The film is made of polypropylene, polyethylene, and polyethylene telephthalate.

Both the coil 22 and the coil 34 are arranged on the supporting member 40 in such a manner that both the coils 22/34 are close-coupled to each other.

The coil arrangement shown in FIG. 10 is similar to that of FIG. 9 in view of operations. However, FIG. 10 represents such a condition that the coil 34 is arranged within the coil 22.

Furthermore, as indicated in FIG. 11, not only the coil 34 is arranged inside the coil 22, but also ????? may be arranged in the on-chip coil IC 32A shown in FIG. 12. The on-chip coil IC 32 is such a member that the coil 34 shown in FIG. 1 is formed with the IC chip 32 in an integral form.

Similar to the coil 22, the coil 34 may be arranged as a spiral plane coil and a multi-spiral coil corresponding to an air-core coil. Also, the coil 34 may be arranged as either a plane coil equipped with a ferrite core, or a ferrite bar antenna.

Figure 8:
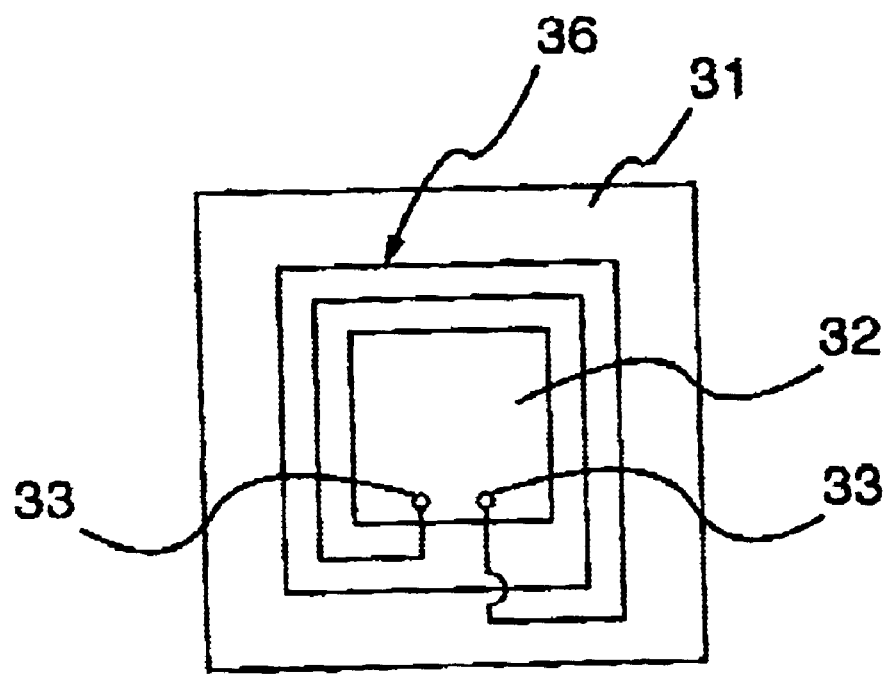
FIG. 8 is an upper plane view for showing a spiral plane coil usable in a non-contact IC module 30 of the non-contact information medium 10 indicated in FIG. 1.

FIG. 8 represents a coil 34 arranged as a spiral plane coil 36. As indicated in this drawing, the spiral plane coil 36 is mounted on the same board 31 together with the IC chip 32, and is connected with the IC chip via one pair of connecting terminals 33.

Similar to the coil 22, the coil 34 may be manufactured by way of any one of the well-known manufacturing methods, for instance, the etching method by using copper and aluminum, the printing method by the printed wiring method, and the forming method by the wire. However, as will be discussed later, when the coil 34 of the present invention is formed with the IC chip 32 in an integral form, there is such a feature that the coil 34 can be formed in either the manufacturing stage of the IC chip 32, or the package forming stage in a similar manner to the normal manufacturing stage of either a chip or a package.

There is no limitation in the structure of the antenna used as the communication unit of the non-contact IC module 30. Also, it should be understood that this antenna structure may widely involve the communication means, which is similar to that of the coil 22.

In the non-contact IC module 30, both the IC chip 32 and the coil 34 are mounted on a single board 31. As a result, the non-contact IC module 30 may own a similar function to that of the conventional non-contact IC card, or the conventional IC tag, or the conventional radio frequency identification (RFID) in view of its function. However, this non-contact IC module 30 owns the below-mentioned different point from the conventional on-contact IC card.

In the conventional non-contact IC card, since the element portion corresponding to the coil 34 is the antenna coil which communicates with the reader/writer 1, this antenna coil must have the substantially same size as that of the coil 22, and further must own the substantially same communication distance thereof. Also, since the dimension of this antenna coil is made considerably larger than that of the IC chip, this antenna coil cannot be mounted on the IC chip, but is separately manufactured. This antenna coil is connected to the IC chip by way of the wire bonding system, the TAB (Tape Automated Bonding) system, or the face down system. In this face down system, while a bump is formed on an IC chip, an anisotropy conductive film is utilized.

With respect to these conventional non-contact IC cards, since the size of the coil 34 is small in the non-contact IC module 30 according to the present invention, the communication distance thereof is short. Thus, if this non-contact IC module 30 owns such a short communication distance, then this non-contact IC module 30 cannot be directly utilized in the application systems for the conventional non-contact IC card.

In accordance with the present invention, since the booster unit 20 is arranged in the vicinity of the non-contact IC module 30, the communication distance of the non-contact IC module 30 may be extended. Alternatively, it should be noted that such a non-contact module 30 shown in FIG. 1, in which the coil 34 is separately formed from the IC chip 32 and is connected to this IC chip 32 and then both the coil 34 and the IC chip 32 are mounted on a single board 31, may be replaced by another non-contact IC module 30A shown in FIG. 12, in which the coil 34 and the IC chip 32 are formed in an integral form. In this case, the board 31 may be alternatively omitted.

In any case, the coil 34 is arranged on the same board 31 with the IC chip 32, or is formed with the IC chip 32 in an integral form. It can be understood that the condition of the built-in coil may be seen, for example, as such a structure that the IC chip 32 is regarded as the active element region, and the board 31 is regarded as the IC chip board in FIG. 8. Also, as previously explained, since the coil 22 can communicate with the coil 34 in the non-contact manner, the non-contact module 30 of the present invention is not assembled in the form of such a conventional card. Accordingly, the function and performance of either the board 31 or the IC chip 32A can be solely checked.

In the conventional non-contact IC card, the IC card and the antenna coil are separately manufactured and checked, and then are separately mounted on this card. Thereafter, the IC chip is connected to the antenna coil.

Subsequently, the functions and performance of the entire conventional non-contact IC card must be checked. As a result, since the performance and the function of the entire conventional non-contact IC card cannot be carried out until both the IC chip and the antenna coil are mounted on this card to be connected to each other, the manufacturing efficiency is not so high.

To the contrary, in the non-contact information medium 10 of the present invention, since the function and the performance of the single structural element itself can be checked, the manufacturing efficiency thereof can be improved, as compared with that of the conventional non-contact IC card.

Also, in accordance with the present invention, the non-contact IC module 30 can be manufactured as a product having an independent function, namely, a single body of this non-contact IC module 30, and a combination product between this non-contact IC module 30 and the booster unit 20. In other word, the non-contact IC module 30 may be stored into a package (molded member) having either an own shape, or a desirable shape. Therefore, the radio-communicatable IC chip of the present invention is not limited to the IC card and/or the IC tag, but also may be widely applied to apparatuses wireless-communicatable with external appliances. Now, various embodiments of the present invention will be explained with reference to FIG. 13 to FIG. 14.

Figure 13:
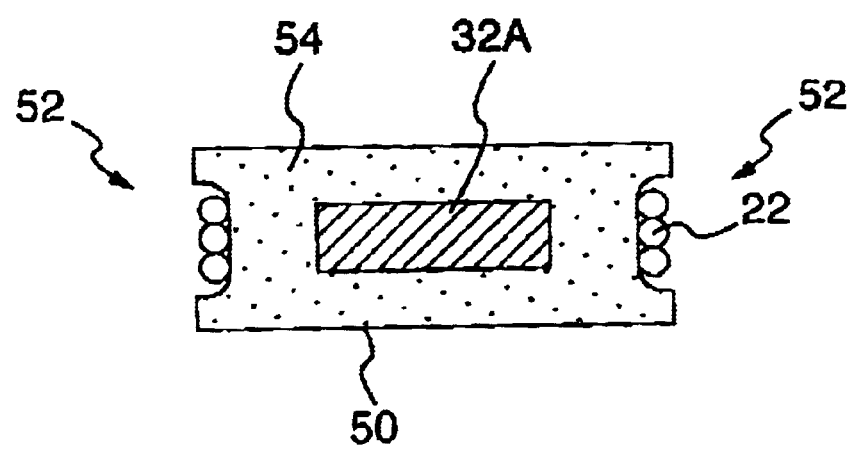
FIG. 13 is a sectional view of a resin molded member 50 according to an embodiment of the present invention.
Figure 14:
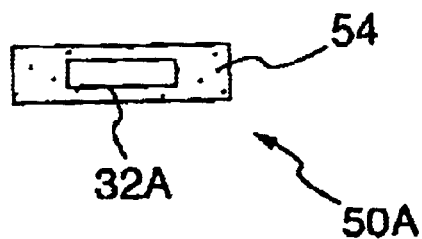
FIG. 14 is a sectional view for indicating a resin molded member 50A according to another embodiment of the present invention.
Figure 15:
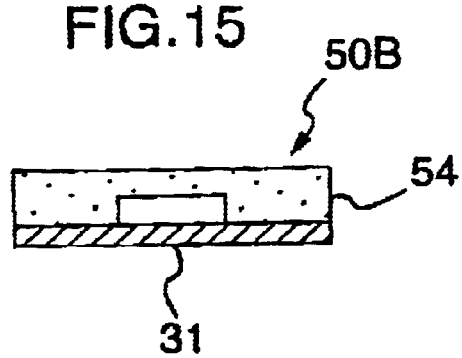
FIG. 15 is a sectional view for representing a resin molded member 50B of the present invention corresponding to a modification of the resin molded member 50A indicated in FIG. 14.
Figure 16:
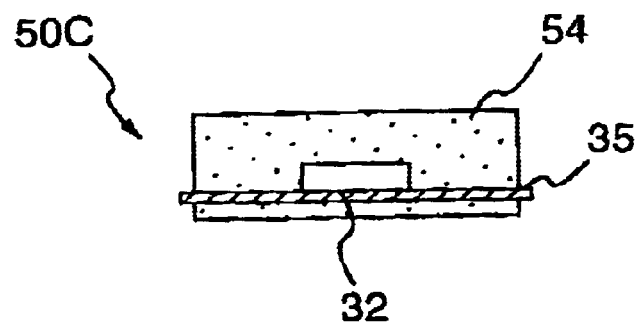
FIG. 16 is a sectional view for representing a resin molded member 50C of the present invention corresponding to another modification of the resin molded member 50A indicated in FIG. 14.
Figure 17:
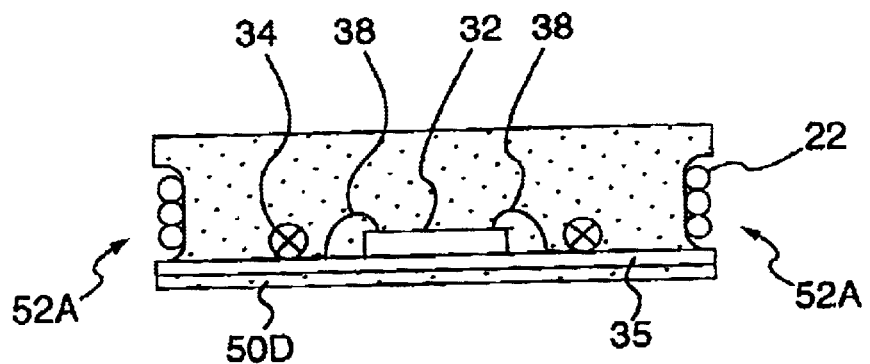
FIG. 17 is a sectional view for showing a resin molded member 50D of the present invention corresponding to a modification of the resin molded member 50 shown in FIG. 13.

FIG. 13 is a sectional view of a resin molded member 50 according to an embodiment of the present invention. FIG. 14 is a sectional view for indicating a resin molded member 50A according to another embodiment of the present invention. FIG. 15 is a sectional view for representing a resin molded member 50B of the present invention corresponding to a modification of the resin molded member 50A indicated in FIG. 14. FIG. 16 is a sectional view for representing a resin molded member 50C of the present invention corresponding to another modification of the resin molded member 50A indicated in FIG. 14. FIG. 17 is a sectional view for showing a resin molded member 50D of the present invention corresponding to a modification of the resin molded member 50 shown in FIG. 13.

The resin molded member 50 of the present invention, shown in FIG. 13, owns resin 54 molded in a bobbin shape, and an on-chip coil IC 32A shown in FIG. 12 is stored into this molded resin 54. This resin molded member 50 has a function of a package of the on-chip coil IC 32A. Also, the coil 22 is wound on a concaved side surface of this resin molded member 50 as a coil forming unit 52. The resin molded member 50 supports the coil 22 on the coil forming unit 52. It should be understood that FIG. 13 exemplifies such a case that the coil 22 is wound by three turns. The resin 54 owns a function capable of sealing the on-chip coil IC 32A to protect this on-chip coil IC 32A. The arrangement between the coil 22 and the on-chip coil IC 32A is essentially similar to the arranging relationship between both elements shown in FIG. 9, FIG. 10, and FIG. 11. These coil 22 and on-chip coil IC 32A are electromagnetically coupled to each other.

Since the on-chip coil IC 32A is sealed in the resin molded member 50, there is no problem such as damages and investigation caused by handling the bare chip. Since the resin molded member 50 is covered by easily-processable resin, it is possible provide such non-contact information medium, according to the present invention, capable of having various shapes and dimensions applicable to various requirements. For instance, while the resin molded member according to the present invention is embedded into a tip portion of a car key in combination with the booster unit 20, both the reader/writer 1 and a processing apparatus connected to this reader/writer 1 are provided in this car. As a result, the processing apparatus acquires the ID information stored in a memory (not shown) of the on-chip coil IC 32A, and then checks the acquired ID information in accordance with a predetermined method, so that this processing apparatus can judge as to whether or not either the car owner or any permitted person is tried to drive the car. As a result, the resin molded member 50 can realize such a burglar alarming function. In this case, the shape and the dimension of this resin molded member 50 may be processed so as to be fitted to the shapes of the car keys.

A resin molded member 50A shown in FIG. 14 corresponds to such a resin molded member that while the shape of the resin molded member 50 shown in FIG. 13 is modified as a cylindrical shape, the coil forming unit 52 is removed therefrom. In FIG. 13, the coil 22 is wound on the coil forming unit 52 so as to be supported. However, the resin molded member 50A indicated in FIG. 14 may be used in such an arrangement as shown in FIG. 9, or FIG. 11.

A resin molded member 50B shown in FIG. 15 corresponds to such a resin molded member that the resin molded member 50A shown in FIG. 14 contains a board 31 made of polyimide. Both the function and the use method of he resin molded member 50B are similar to those of the resin molded member 50A shown in FIG. 14. As apparent from the foregoing description, this resin molded member 50B may function as an independent IC having neither a power supply, nor input/output pin and realized based on the new concept.

The function of the board 31 shown in the resin molded member 50B is merely equal to a similar function as a supporting base. However, as shown in FIG. 16, this board 31 may be replaced by a lead frame 35. The lead frame 35 contains a test terminal (pin) and the like, and owns such a merit that this lead frame can be used in testing operations when the resin molded member is assembled. In other words, the resin molded member 50C shown in FIG. 16 may function as an independent IC package having a pin. After the testing operation. has been accomplished, the edge surface of the lead frame 35 is cut off. Namely, the lead frame 35 provided in the resin molded member 50C shown in FIG. 16 represents such a condition that this lead frame 35 is not yet cut off. A projected portion of this lead frame 35 is cut off at edge surfaces (right/left edge surfaces in FIG. 16) of the resin molded member 50C after the necessary testing operation has been completed. Apparently, while the lead frame 35 is selectively brought into the projection condition, the resin molded member 50C may be used. It should be understood that since the lead frame 35 having the function as the supporting base is similar to the board 31, the board 31 and the lead frame 35 may be mutually replaced with each other not only in FIG. 15, but also in other drawings.

FIG. 17 represents a further resin molded member 50D. This resin molded member 50D corresponds to such a resin molded member that in the resin molded member 50 shown in FIG. 13, the on-chip coil 32A is subdivided into an IC chip 32 and a coil 34 (alternatively, combination between IC chip 32 and spiral plane coil 36 shown in FIG. 8). In other words, since the resin molded member 50D owns a larger coil than the coil of the resin molded member 50, this resin molded member 50D may have such a merit that the communication distance thereof is longer than that of the resin molded member 50. The coil 34 is connected to the IC chip 32 by employing a wire bonding (otherwise TAB) line 38. As explained above, the lead frame 35 may be substituted by the board 31.

Figure 18:
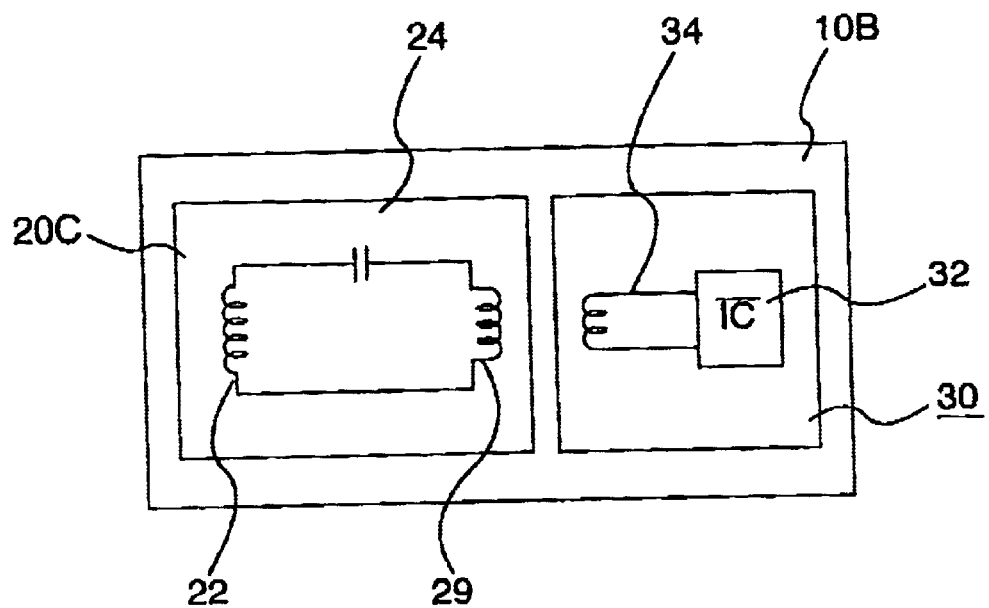
FIG. 18 is a block diagram for showing a non-contact information medium 10C according to another embodiment of the present invention.

FIG. 18 is a block diagram for showing a non-contact information medium 10C according to another embodiment of the present invention. This non-contact information medium 10C has such a different point that a booster unit 20C is employed instead of the booster unit 20, as compared with the non-contact information medium 10 shown in FIG. 1. The booster unit 20C owns such a different point that another coil 29 is employed in addition to the coil 22, as compared with the booster unit 20.

In accordance with the booster unit 20 of this embodiment, the coil 22 will communicate with the reader/writer 1, whereas the coil 29 will communicate with the coil 34 of the non-contact IC module 30. Such a point that the coil 29 is electromagnetically coupled to the coil 34, and communicates with this coil 34 in the non-contact manner is similar to the coil 22 of FIG. 1.

Figure 19:
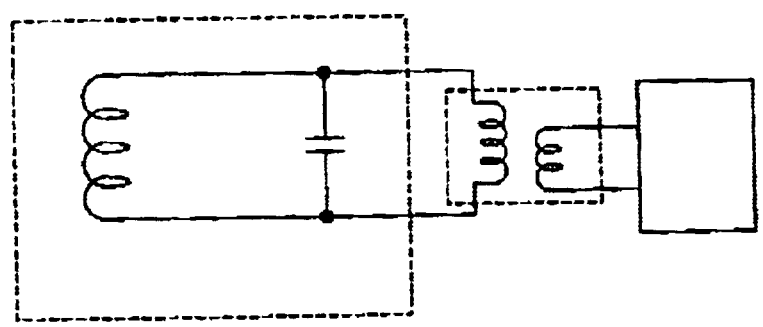
FIG. 19 is a block diagram for indicating a modification of a booster unit of the non-contact information medium 10C shown in FIG. 18.

In this case, the arrangement between the capacitor 24 and the coil 22 may be realized by way of either an LC series-resonant circuit shown in FIG. 18 or an LC parallel-resonant circuit shown in FIG. 19. In this case, both the coil 29 and the coil 34 shown in FIG. 18 own such a current transformer function that the current of the LC series-resonant circuit is converted by these coils 29 and 34 to transfer the converted current to the IC chip 32. On the other hand, both the coil 29 and the coil 34 shown in FIG. 19 own such a voltage transformer function that the voltage of the LC parallel-resonant circuit is converted by these coils 29 and 34 to transfer the converted voltage to the IC chip 32.

Subsequently, a description will now be made of a method for manufacturing the non-contact information medium 10 according to the present invention. The arrangement of the booster unit 20 is simply made of a communication unit and a capacitor. The communication unit is arranged by a coil, or an antenna. Since the manufacturing method of this booster unit 20 may be readily conceived by the ordinarily skilled engineers, a detailed description thereof is omitted.

Also, as previously explained, in principle, the manufacturing method of the non-contact IC module 30 is similar to the manufacturing method of the conventional non-contact IC module except that the size of the coil 34 is made small and is mounted on the board 31. It should also be understood that since the non-contact IC module 30 of the present invention is manufactured in the form of a unit and also is coupled to the booster unit in the non-contact manner, the communication performance, the processing performance, the storage performance, the connection performance and the like of the non-contact memory element 30 in a single element may be checked before this non-contact memory element 30 is packaged. As a result, since there is such a feature that only non-contact memory elements 30 which could pass these test operations may be packaged, the manufacturing efficiency thereof can be increased, as compared with that of the method for manufacturing the conventional non-contact IC card.

For instance, as shown in FIG. 17, in the non-contact IC module 30, the antenna circuit may be manufactured by utilizing the hybrid IC technique. In accordance with this manufacturing method, the antenna circuit 34 is formed on either the board 31 or the lead frame 35. Thereafter, the IC chip 32 is mounted, and then is connected to the antenna circuit 34 by way of the wire bonding (or TAB).

Next, a description will now be made of a method for manufacturing the on-chip coil IC 32A, which may constitute one of the features accomplished by the present invention. That is, the manufacturing method of the on-chip coil IC 32A according to the present invention owns such a feature that the on-chip coil IC 32A can be manufactured in accordance with a basic manufacturing stage used to manufacture the IC chip 32, as exemplified in FIG. 20 (monolithic method).

Figure 20:
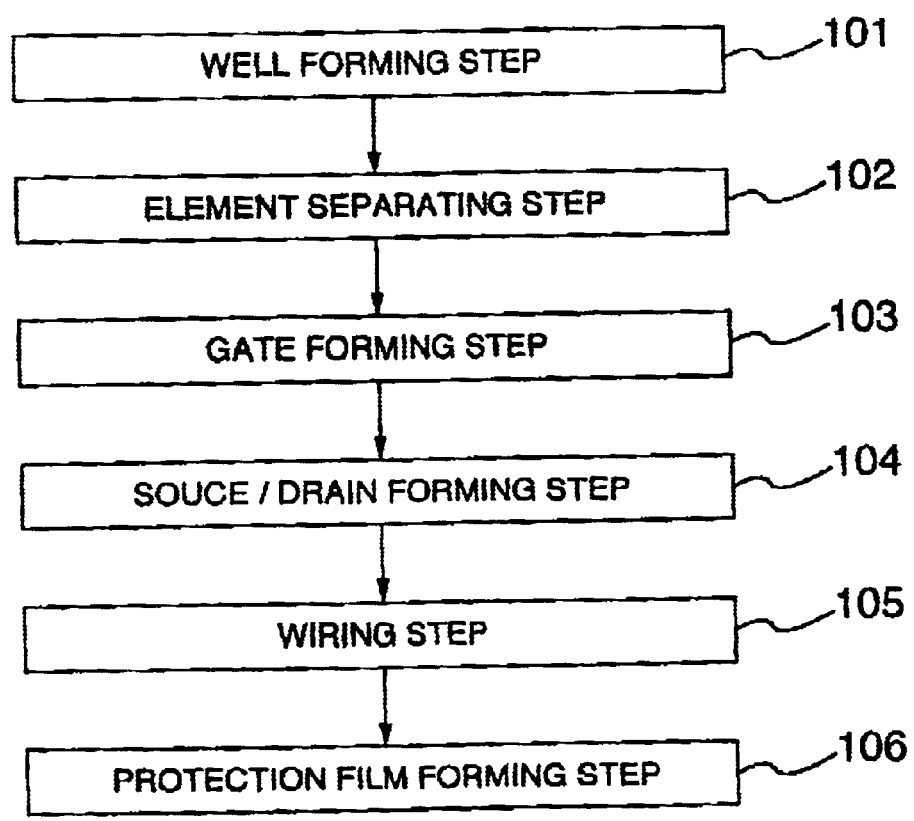
FIG. 20 is a flow chart for explaining a method for manufacturing an on-coil IC chip 32A according to the present invention.

In this case, the coil 34 is formed in a wiring stage 105 of FIG. 20 that a pattern of a built-in (antenna) coil is added to a mask similar to a wiring pattern.

Figure 21:
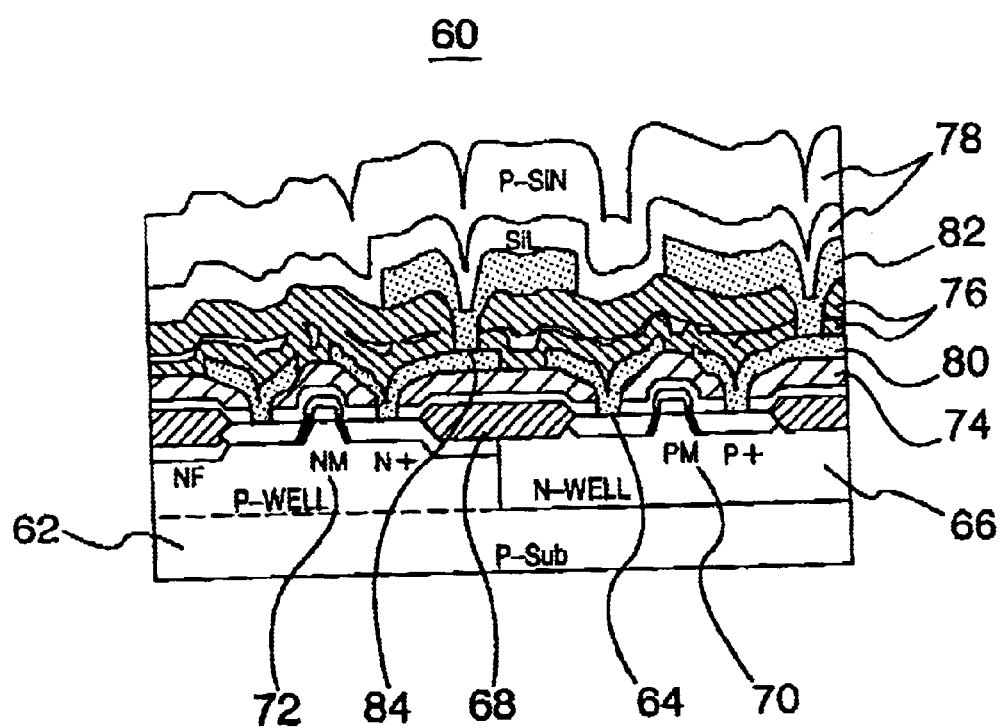
FIG. 21 is a sectional view for representing a two layer metal structure applicable to the on-coil IC chip 32A of the present invention.
Figure 22:
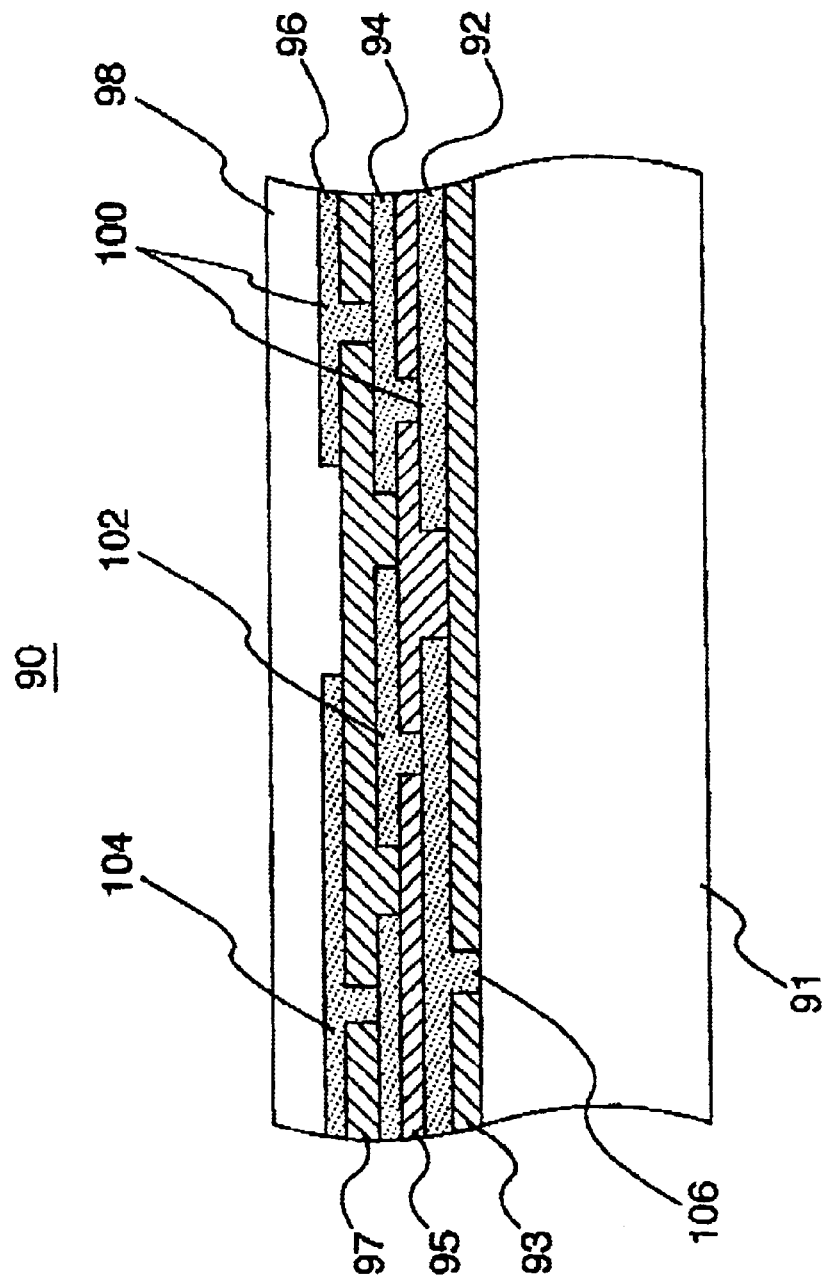
FIG. 22 is a sectional view for showing a three layer metal structure applicable to the on-coil IC chip 32A of the present invention.

FIG. 21 and FIG. 22 indicate such a case that the coil is formed in accordance with the above-explained wiring stage. FIG. 21 is a sectional view for showing a major portion of an on-chip coil IC 60. In the on-chip coil IC 60, a built-in coil is formed as such a simple spiral plane coil as shown in FIG. 8, and both wiring lines and the coils are constituted by a two-layer metal. FIG. 22 is a sectional view for indicating a major portion of an on-chip coil IC 90 in which while a built-in coil is formed as a multi-spiral coil, both wiring lines and coils are constituted by a three-layer metal. It should be noted that in FIG. 22, although the wiring lines among the wells, the sources, the gates, the drains, and other constructive elements are omitted and also the planer method is omitted, these techniques can be readily understood from the well-known techniques utilized in this technical field. The respective metal layers are mainly constituted by aluminum. Preferably, the respective metal layers may be constituted by employing such an alloy containing a small amount of other elements because the reliability thereof can be improved. This idea may be similarly applied to all of metal layers (will be discussed later), With reference to FIG. 22, the on-chip IC chip 90 shows the three-layer metal applied to such a coil having a large number of coil turns (namely, multi-spiral coil). Metal layers 92, 94 and 96 made of the three-layer, and furthermore, interlayer films 93, 95 and 97 are formed on a major portion 91 of a device which contains a substrate, a well, a source, a drain, a gate, and the like. Also, a protection film 98 is formed on the upper portion of this device. The respective metal layers are connected to each other, and also to the major portion 91 in connection units 100, 102, 104, and 106.

It should be understood that the manufacturing method of the on-chip coil IC according to the present invention is not apparently limited to the above-explained monolithic manufacturing method. For instance, this on-chip coil IC may be formed by utilizing, for example, the normal wiring method for the input/output pins of the bare chip IC. In other words, in this normal wiring method, the wiring pattern to the pins corresponds to such a pattern for directly forming the coil.

Furthermore, a description will now be made of another method for manufacturing an on-chip coil. This manufacturing method may be accomplished by applying a packaging technique of an IC chip used as a CSP (chip scale package) technique. That is to say, the present manufacturing method corresponds to a featured technique of a wafer scale integration executed up to a packaging stage under wafer state, namely, input pins and wiring line layers are formed on a chip surface.

Figure 23:
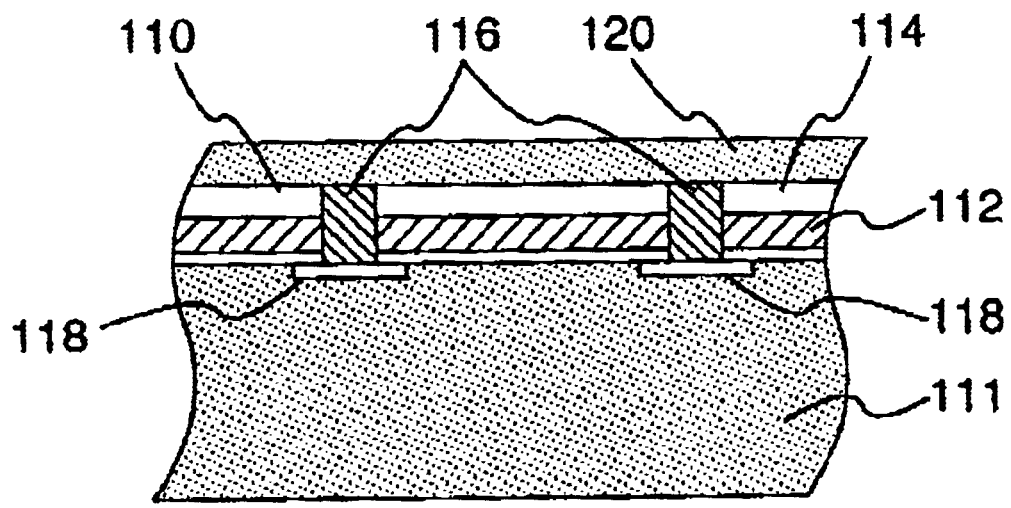
FIG. 23 is a sectional view of a major portion for explaining another manufacturing method of the on-coil IC chip 32A of the present invention.

An antenna may be formed by utilizing a rewiring layer in this wiring line method. FIG. 23 is a sectional view for indicating a major portion of an on-coil IC chip 110 manufactured by this manufacturing method. In this case, after the wiring stage 105 shown in FIG. 20 is completed, an insulating layer 112 is furthermore formed on the IC circuit 111 which has been essentially accomplished. Next, a metal layer 114 is formed on the insulating layer 112, and this is patterned to thereby form an antenna circuit. The antenna circuit and the respective terminals of the IC circuit 111 located at an under layer of this antenna circuit are connected to each other via a throughhole 116 formed in the insulating layer 112, and also aluminum pads 118 which have been previously formed on the respective terminals. It should be noted that as indicated in FIG. 13 to FIG. 17, a completed product can be molded on a resin molded member 120.

It should also be noted that when the metal layer 114 is formed and patterned, the following method is useful, namely the method for forming a thicker conductive pattern having a small resistance by way of a plating technique other than an etching treatment.

Figure 24:
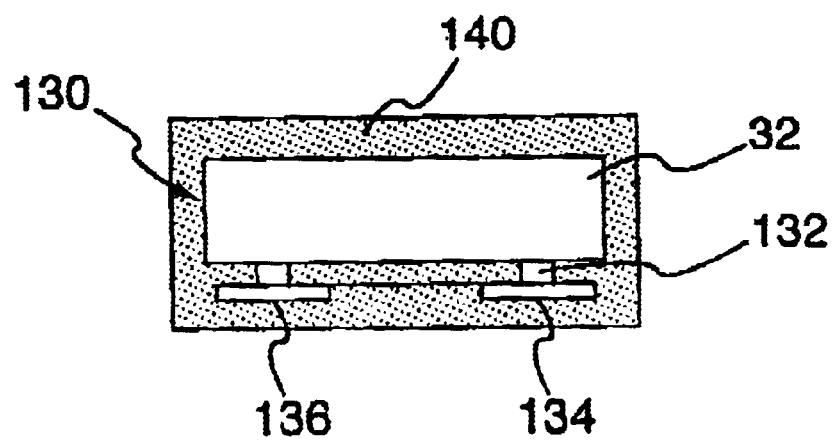
FIG. 24 is a sectional view of a major portion for explaining a further manufacturing method of the on-coil IC chip 32A of the present invention.

Apparently, as another method, as indicated in FIG. 24, a packaging terminal 132 such as a bump may be alternatively formed on the IC chip 32, and then the IC chip 32 may be connected to an antenna coil 134.

It is, of course, that as another method, as indicated in FIG. 24, a packaging terminal 132 such as a bump may be alternatively formed on the IC chip 32, and then the IC chip 32 may be connected to an antenna coil 134. That is, FIG. 24 is a sectional view for showing a major portion of an on-chip coil IC 130 having such a structure. Alternatively, an isotropic conductive film 136 may be selectively provided between the bump 132 and the coil 134. It should be noted that as shown in FIG. 13 to FIG. 17, a completed product can be molded on a resin molded member 140.

Figure 25:
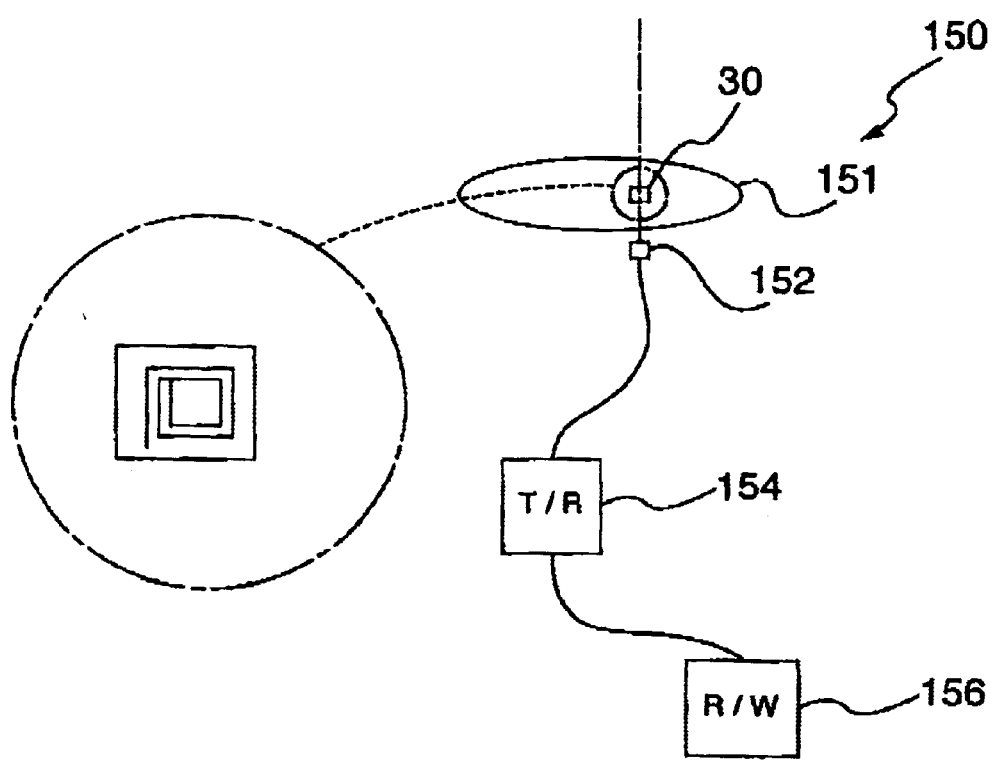
FIG. 25 is an explanatory diagram for explaining a method for checking a non-contact IC module 30 of the present invention.

Referring now to FIG. 25, a method for checking the non-contact IC module 30 according to the present invention will be described. FIG. 25 is a perspective view for explaining the checking method of the present invention and a checking system of the present invention. That is, in the checking method according to the present invention, the non-contact IC module 30 is checked by employing a non-contact probe (antenna) 152 instead of the conventional contactor. In the checking system 150 according to the present invention, a manufacturing code is written into a chip, and also initial data is written into the chip.

First, the non-contact probe 152 is coupled to a wafer 151 on which the non-contact IC module 30 is formed. A transmission/reception signal is transmitted via a transmitting/receiving circuit 154 connected to the probe 152 to a reader/writer 156, and to an external processing apparatus selectively connected to the reader/writer 156, so that a function and performance thereof are tested, and further, necessary data is written.

As previously explained, in accordance with the checking method of the present invention, since the IC module can be checked in the non-contact manner, it is possible to avoid damages of the checked IC caused by the probe contacting action. Furthermore, since the probe need not be made in contact with the very small terminals, the IC checking operation can be easily carried out. To the contrary, the conventional IC checking operation is performed in such a manner that the contacts of the probe is made in contact with the IC under test. In addition, the dimension of the probe used in the checking method of the present invention may be made larger than that of the conventional probe, so that such a very small-sized probe is no longer manufactured.

In accordance with the method for manufacturing the non-contact information medium 10 of the present invention, this non-contact checking method can be carried out while maintaining the wafer condition. This may constitute the function established as the non-contact IC module, so that this non-contact checking operation can be carried out only one time.

Next, operations of the non-contact information medium 10 according to the present invention will now be described. Referring to FIG. 1, as to the non-contact information medium 10 of the present invention, various sorts of utilizations may be expected similar to the non-contact IC cards and the IC tags. These utilization fields involve financial fields (cash card, credit card, electronic money management, firm banking, home banking etc.); circulation fields (shopping card, gift certificate etc.); medical fields (patient's registration card, health insurance, health record notebook etc.); traffic fields (stored fare card (SF), coupon ticket, driver's license, commuter pass, pass port etc.); insurance fields (insurance policy etc.); security fields (security etc.); educational fields (student certificate, list of student's grades etc); business fields (ID card etc.); administration fields (document for certifying seal registration, resident's card etc.) and so on.

In the above-described embodiment, the following arrangement has been described. That is, the booster unit 20 is constituted with the non-contact IC module 30 in the integral form. Furthermore, a new effect may be achieved by such that a new booster having a similar function to that of the above-described booster unit is independently provided.

Referring now to FIG. 26 to FIG. 34, a description will be made of a communication system 201, according to the present invention, equipped with a communication auxiliary apparatus 230 having the above-explained new booster function.

It should be noted that in the respective drawings, members, or components to which the same reference numerals are applied indicate the same members, or components, members, or components to which alphabets are given to the same reference numbers indicate modified members, or components corresponding thereto, and therefore, the same descriptions thereof are omitted. Also, a reference numeral involves all of the same reference numerals attached with alphabets.

Figure 26:
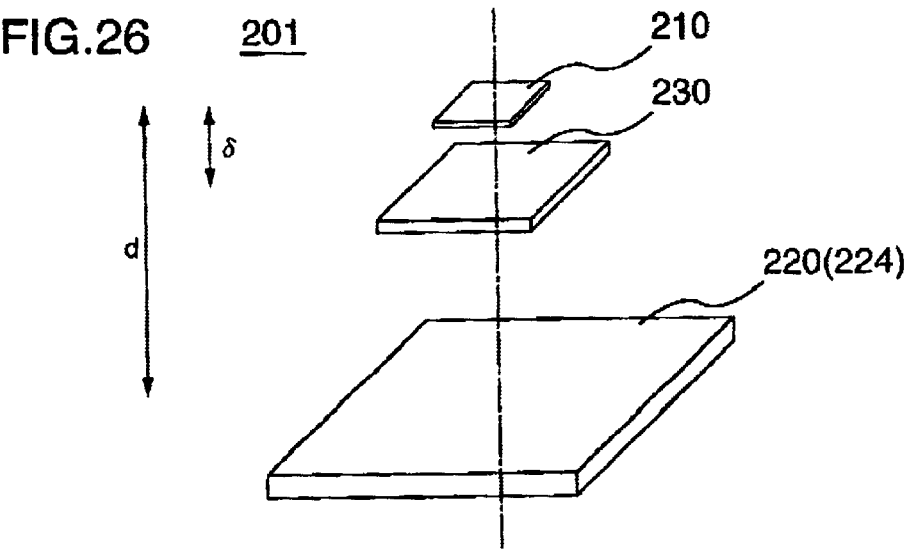
FIG. 26 is a perspective view for representing an arrangement of a communication system according to an embodiment of the present invention.

FIG. 26 is a diagram for indicating an arrangement of a communication system 201 according to another embodiment of the present invention. As indicated in this drawing, the communication system 201 of the present invention is provided with a non-contact information medium 210, an external apparatus (appliance) 220, and a communication auxiliary apparatus 230. In this embodiment, a non-contact IC card is employed as a typical example of this non-contact information medium 210, and also a reader/writer is employed as a typical example of this external apparatus 220. As a consequence, reference numerals 210 and 220 totally involve these apparatuses. Precisely speaking, the external apparatus 220 shown in FIG. 26 corresponds to an antenna unit 224 of the external apparatus 220 (will be discussed later).

Figure 27:
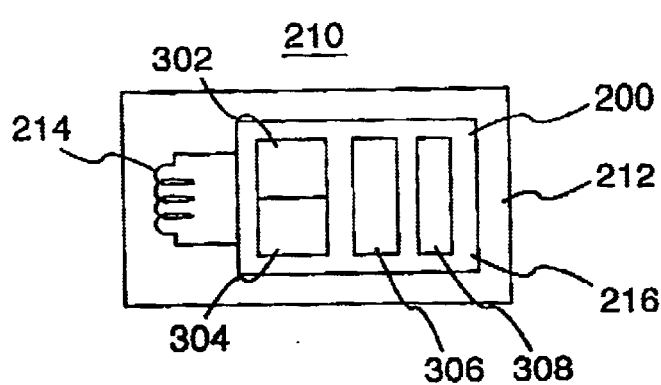
FIG. 27 is a block diagram for showing a structure of a non-contact IC card of the communication system shown in FIG. 26.
Figure 28:
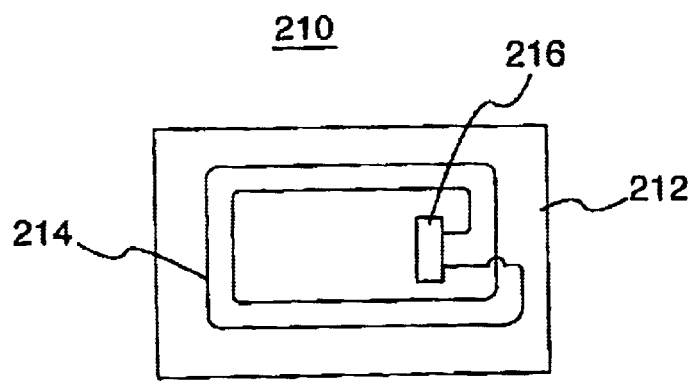
FIG. 28 is a conceptional diagram for schematically showing the non-contact IC card shown in FIG. 27.
Figure 29:
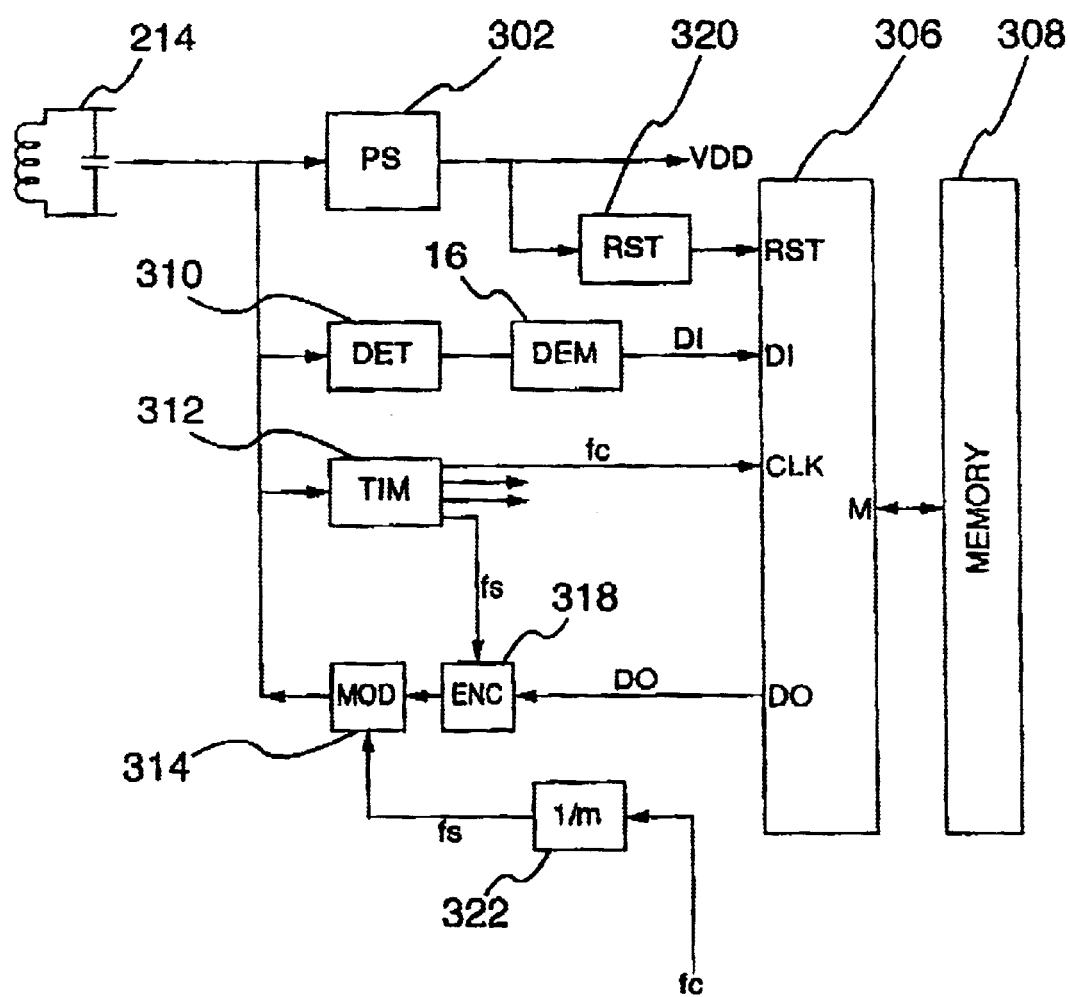
FIG. 29 is a block diagram for indicating the respective circuit portions of the IC chip more in detail, indicated in FIG. 27 and FIG. 28.

As shown in FIG. 27 to FIG. 29, in the non-contact card 210, both an antenna coil 214 and an IC chip 216 are provided on a base member 212. In this case, FIG. 27 is a block diagram for showing a structure of the non-contact IC card 210.

Furthermore, as a non-contact IC card, such a IC card may be conceived in which the booster unit 20 shown in FIG. 1 is built.

FIG. 27 conceptionally indicates the antenna coil 214. In the actual non-contact IC card 210, the antenna coil 214 is formed in such a manner that, for example, this antenna coil 214 surrounds the IC chip 216. In this case, FIG. 28 is a schematic diagram for indicating the non-contact IC card 210.

When the non-contact IC card is arranged with the arrangement of FIG. 1, a coil 214 of FIG. 28 corresponds to the coil 22 of the booster unit 20 of FIG. 1.

FIG. 29 is a block diagram for representing the respective structural components of the IC chip 216 more in detail. The base member 212 is made of, for example, a plastic material.

Referring now to FIG. 27, the IC chip 212 contains a power supply circuit 302, a transmitting/receiving circuit 304, a memory 308, a logic control circuit 306, and a clock (not shown). Also, with reference to FIG. 29 for indicating the IC chip 216 more in detail, a reset signal generating circuit 320 is connected to the power supply circuit (PS) 302, and this reset signal generating circuit 320 is connected to a reset germinal (RST) of the logic control circuit 306. The transmitting/receiving circuit 304 includes a detector (DET) 310, a modulator (MOD) 314, a demodulator (DEM) 316, and an encoder (ENC) 318. Both the demodulator 316 and the encoder 318 are connected to a data terminal DI and another data terminal DO of the logic control circuit 306, respectively.

The IC chip 216 further contains a timing circuit (TIM) 312 for producing various sorts of timing signals, and a frequency divider 322 for frequency-dividing a carrier frequency "$f_c$" to produce a sub-carrier frequency. The timing circuit 312 is connected to a clock terminal (CLK) of the logic control circuit 306. The logic control circuit 306 is connected via a memory terminal (M) to the memory 308.

As previously explained, the non-contact IC card 210 does not contain any battery. The power supply circuit 302 produces operating electric power VDD from the electromagnetic wave (carrier frequency $f_c$) received by the antenna 214 by way of the electromagnetic induction. This operating electric power VDD is used to the respective circuit elements of the IC chip 216. When the operating electric power VDD is produced, the reset signal generating circuit 320 resets the logic control circuit 306 so as to prepare a new operation. Also, the carrier frequency $f_c$ is also supplied to the frequency divider 322. "m" of the frequency divider 322 is set to, for example, 16 and 32. The frequency divider 322 is connected to the timing circuit 312, and produces a sub-carrier frequency "$f_s$" in synchronism with the timing signal (clock) produced from the timing circuit 312.

The reception unit of the transmitting/receiving circuit 304 is arranged by a detector 310 and a demodulating circuit 316. The received signal having the carrier frequency "$f_c$" is detected by the detector 310 and then data is reproduced by the demodulating circuit 316, and this reproduced data is sent to the logic control circuit 306.

The transmitter unit of the transmitting/receiving circuit 304 is arranged by the modulator 314 and the encoder 318. Any types of circuit arrangements well-known in this technical field may be employed in the modulator 314 and the encoder 318. To transmit the data, the carrier wave is changed in response to the transmission data, and then the changed carrier wave is transmitted to the coil 214. As the modulating system, for example, the ASK modulating system in which the amplitude of the carrier frequency is varied may be used, and also the PSK modulating system in which the phase of the carrier frequency is varied. In this embodiment, a so-called "load modulating system" is used.

Furthermore, in this embodiment, the load modulating system with employment of the sub-carrier is employed. In other words, in this modulating system, the amplitude of the carrier is modulated in accordance with the amplitude of the sub-carrier.

As previously explained, in this embodiment, the carrier frequency "$f_c$" (for example, 13.56 MHz) is frequency-divided by the frequency divider 322 to thereby produce the sub-carrier frequency "$f_s$" (for instance, 847.5 KHz=$f_c/16$).

It should also be noted that the sub-carrier may be produced by employing other methods.

Figure 30:
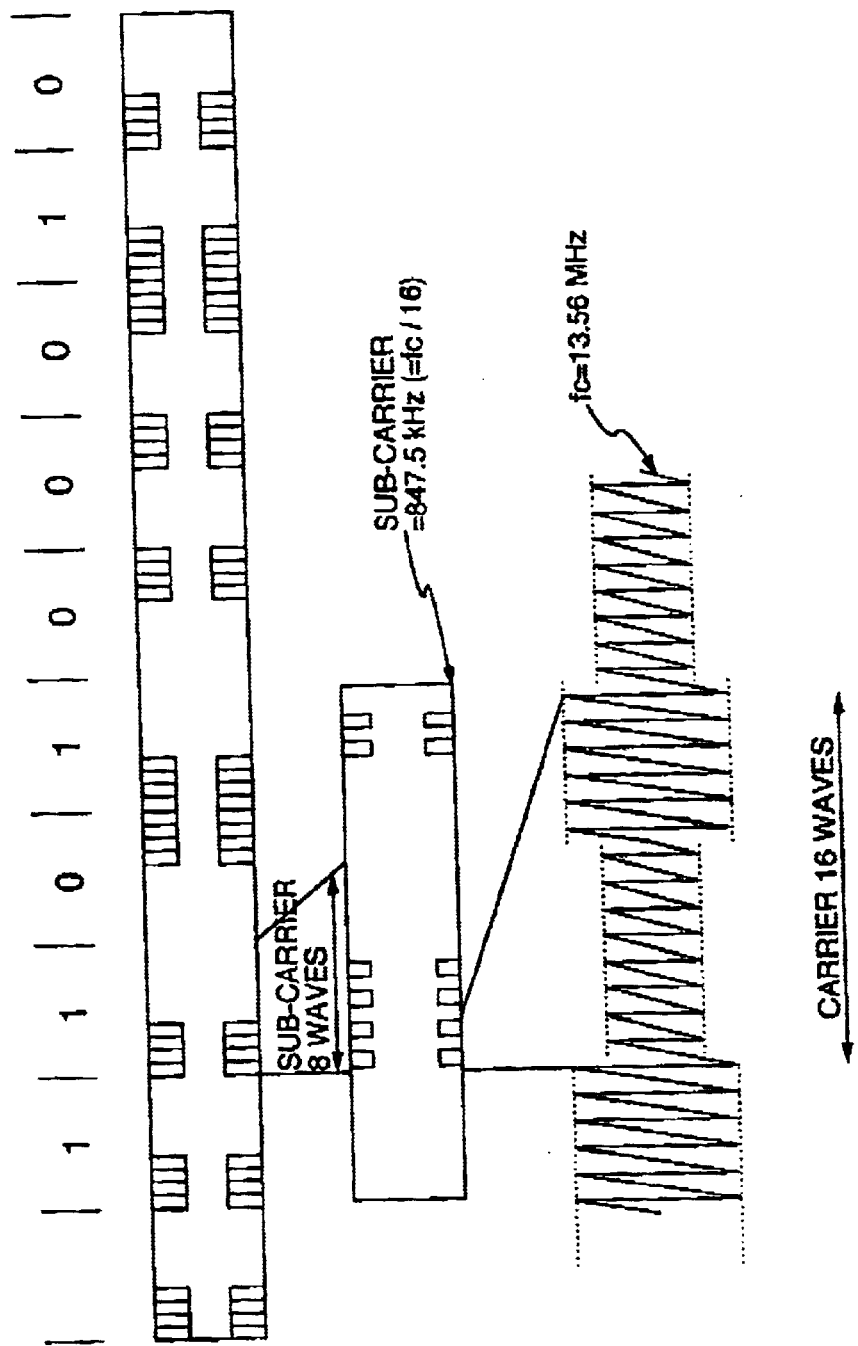
FIG. 30 is a waveform diagram for representing one example of a waveform of a signal transmitted from the non-contact IC card of FIG. 27.

The sub-carrier frequency "$f_{sc}$" is sufficiently lower than the carrier frequency "$f_c$". The encoder 318 encodes (bit-encoding) data "DO" to be transmitted by using a preselected code (for example, Manchester coding, and PSK coding). Thereafter, the encoded data DO is modulated by the sub-carrier frequency "$f_s$", and the modulated data DO is transmitted to the reader/writer 220. FIG. 30 indicates an example of a load-modulated waveform with employment of the Manchester code.

Since the sub-carrier "$f_{sc}$" is utilized, the transmission data can avoid interference caused by the carrier "$f_c$" which constitutes the operating power source of the non-contact information medium 210. Accordingly, the communication reliability can be improved.

Both the modulator 314 and the demodulator 316 are operated under control of the logic control circuit 306 in response to the timing signal (clock) generated by the timing circuit 312. The logic control circuit 306 may be realized by employing even a CPU. The memory 308 is constructed of a ROM, a RAM, an EEPROM and/or an FRAM, capable of saving data. The non-contact IC card 210 will communicate with the reader/writer 220 based upon this data, and the logic control circuit 306 is capable of performing a predetermined processing operation. For example, the memory 308 can store thereinto data about ID information, values and transaction records such as electronic money with a preselected amount, and other information. The logic control circuit 306 can execute a process operation.

It should also be noted that since the structures and the operations of these structural elements can be readily understood by the ordinarily skilled engineers, detailed descriptions thereof are omitted.

Depending upon the positional relationship with respect to the communication auxiliary apparatus 230 and other conditions, the coil 214 owns a desirable dimension, a desirable shape, a desirable self-inductance, and a desirable mutual-inductance. For instance, as viewed from the upper direction, the shape of the antenna coil 214 is not limited to the circular shape, but may be selected from a rectangular shape, an elliptic shape, and the like.

Figure 31:
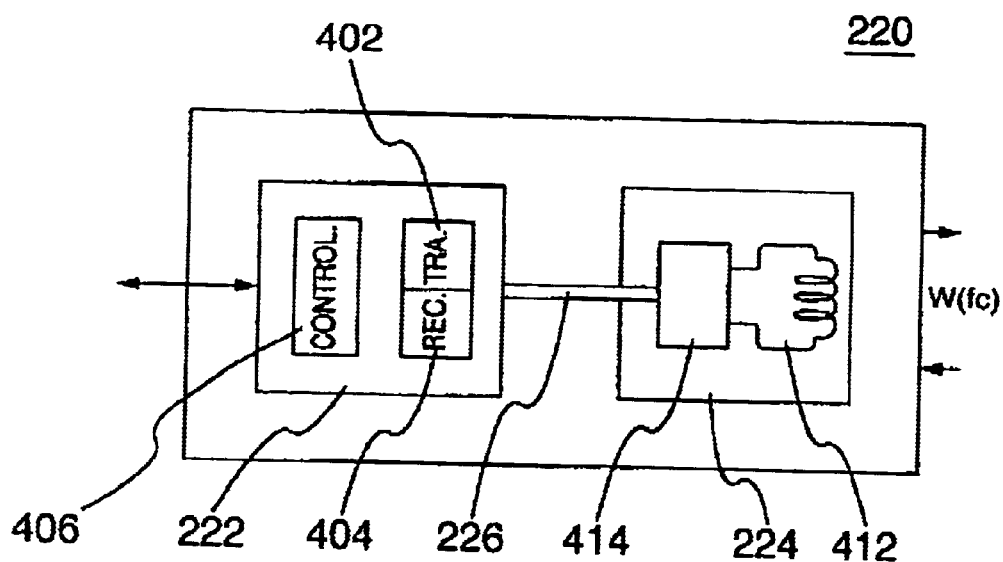
FIG. 31 is a block diagram for representing an arrangement of a reader/writer of the communication system shown in FIG. 26.

As indicated in FIG. 31, the reader/writer 220 contains both a control interface unit 222 and an antenna unit 224. These control interface unit 222 and antenna unit 224 are connected to each other by using a cable 226. In this case, FIG. 31 is a block diagram for indicating an arrangement of the reader/writer 220. The reader/writer 220 transmits the electromagnetic wave W having the carrier frequency $f_c$ to the non-contact IC card 210, and receives this electromagnetic wave W from the non-contact IC card 210 so as to communicate with this non-contact IC card 210 by utilizing the radio communication. It should also be noted that as the electromagnetic wave W, a carrier frequency "$f_c$" (for example, 13.56 MHz) in an arbitrary frequency band may be used. The reader/writer 220 is connected via the control interface unit 222 to a further external host apparatus (not shown) such as a processing apparatus, a control apparatus, a personal computer, a display, and the like.

The control interface unit 222 contains a transmitter circuit (modulator circuit) 402, a receiver circuit (demodulator circuit) 404, and a controller 406. The transmitter circuit 402 modulates the data supplied from the external host apparatus by utilizing the carrier frequency $f_c$ to convert this data into a transmission signal, and then transmits this transmission signal to the antenna unit 224.

While the data is transmitted from the reader/writer 220 to the non-contact IC card 210, the carrier frequency $f_c$ may be utilized so as to modulate this data by way of the modulation system such as Modified Miller.

Figure 32:
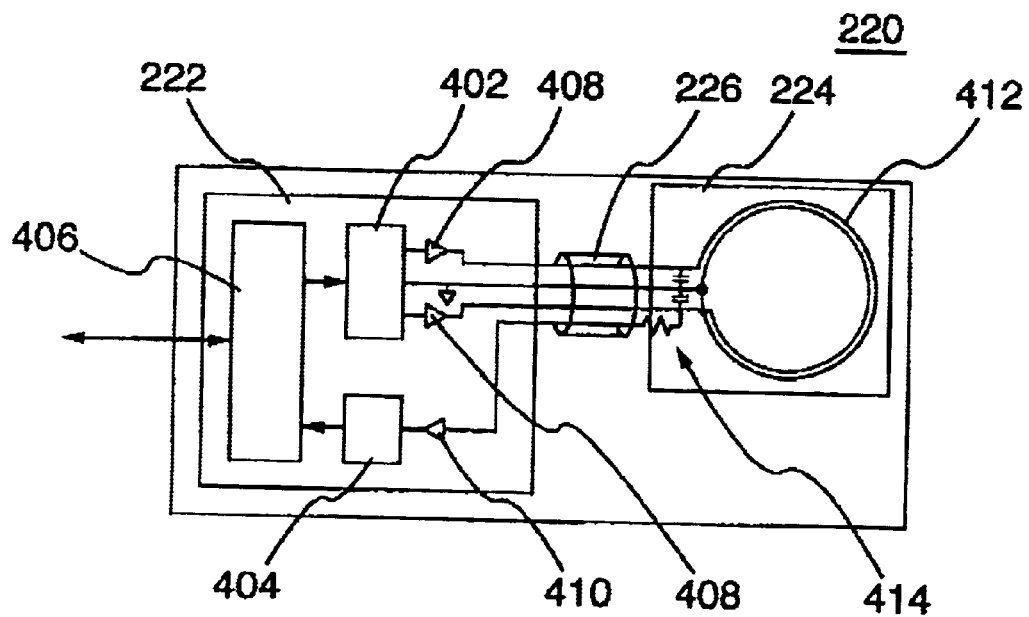
FIG. 32 is a conceptional diagram for schematically showing the reader/writer indicated in FIG. 31.

The receiver circuit 404 decodes the signal derived from the non-contact IC card 210 via the antenna unit 224 so as to obtain data, and then transmits the data to a further external host apparatus. FIG. 32 schematically indicates an antenna coil 412 and the like provided in the reader/writer 220.

It should also be noted that since the operations and the constructions of the transmitter circuit 402, the receiver circuit 404, and the driver circuits 408 and 410 can be readily understood and realized by the ordinarily skilled engineers, a detailed description thereof is omitted.

The antenna unit 224 contains, for example, an antenna coil 412 and a matching circuit 414 as indicated in FIG. 32.

Next, a description will now be made of the communication auxiliary apparatus 230 in the communication system 201 according to the present invention. First, a basic arrangement of the communication auxiliary apparatus 230 is completely identical to that of the booster unit 20 shown in FIG. 1. That is to say, only the booster unit is independently provided. Although booster units shown in FIG. 33 and FIG. 34 own the same arrangements as the arrangement of the booster unit shown in FIG. 1, as to the communication auxiliary apparatus, the following circuit arrangements are provided. That is, the circuit arrangement of the communication auxiliary apparatus 230 is realized by setting the resonant frequency of the resonant circuit of the booster circuit to the carrier frequency "$f_c$", the circuit management thereof is realized by setting the resonant frequency of the resonant circuit of the booster circuit to the sub-carrier frequency "$f_{sc}$", and the circuit management thereof is realized by setting the resonant frequency of the resonant circuit of the booster circuit to both the carrier frequency "$f_c$" and the sub-carrier frequency "$f_{sc}$".

The communication auxiliary apparatus 230 may have such an effect capable of mitigating restrictions in the communication distance between the non-contact information medium 210 and the reader/writer 220, namely the effect capable of extending the communication region.

This communication method causes the communication auxiliary apparatus 230 in such a manner that the normal direction of the antenna coil 232 of the communication auxiliary apparatus 230 is made coincident with the normal direction of the antenna coil 412 of the antenna unit 224 of the reader/writer 220.

A distance "d" between the reader/writer 220 and the communication auxiliary apparatus 230 is varied within a range of this distance in such a manner that the communication auxiliary apparatus is electromagnetically coupled to the reader/writer.

The function capable of emphasizing the sub-carrier $f_{sc}$ component of the communication auxiliary apparatus 230 is not essentially used when the data is transmitted from the reader/writer 220 to the non-contact IC card 210. As previously explained, the reader/writer 220 can modulate the transmission data based upon the carrier frequency $f_c$, and then can transmit this transmission data to the non-contact IC card 210 without using the communication auxiliary apparatus. As a result, while the data is transmitted from the non-contact IC card 210 to the reader/writer 220 by modulating the transmission data by the sub-carrier frequency $f_{sc}$, the communication auxiliary apparatus 230 is so operated as to relay the electromagnetic wave W transferred from the non-contact IC card 210 to the reader/writer 220.

The communication auxiliary apparatus 230 is not required to be arranged between the non-contact information medium 210 and the reader/writer 220, but may be arranged just above the non-contact information medium 210.

Figure 33:
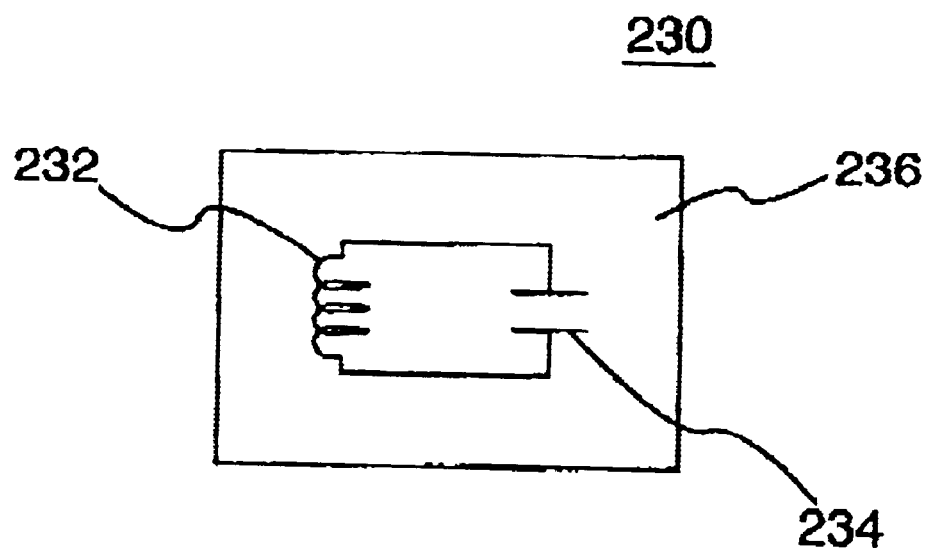
FIG. 33 is a circuit diagram for indicating an outline of a communication auxiliary apparatus according to the embodiment of FIG. 26, which is applicable to the communication system of the present invention.
Figure 34:
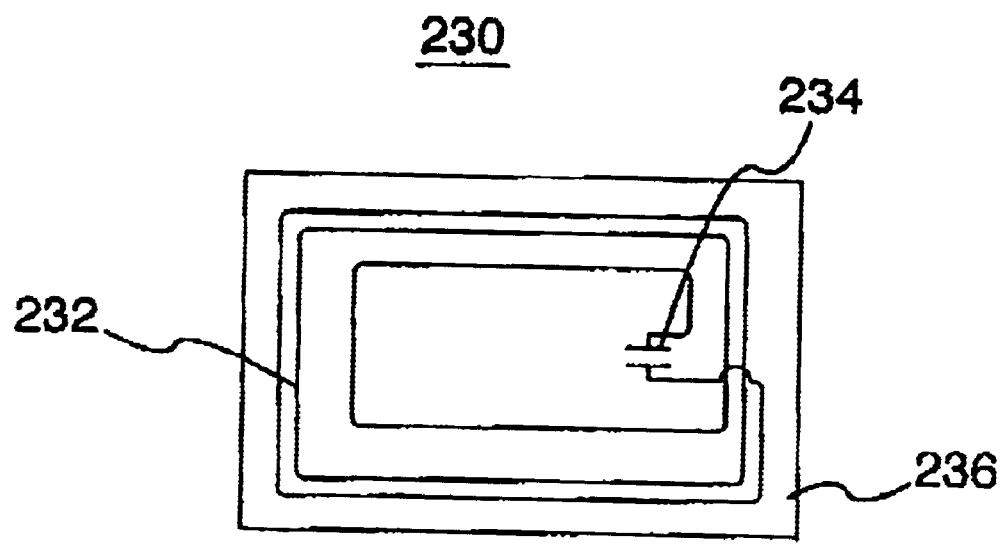
FIG. 34 is a perspective view for indicating a more concrete communication auxiliary apparatus used to realize the circuit of FIG. 33.

As shown in FIG. 33, the communication auxiliary apparatus 230 owns an antenna coil 232 having a self-inductance "L", and a resonant capacitor 234 having an electrostatic capacitance "C". The resonant frequency "$f_r$" of the circuit shown in FIG. 33 becomes $(1/2\pi)(LC)^{-1/2}$. If this resonance frequency $f_r$ is made coincident with the sub-carrier frequency "$f_{sc}(=f_c/m)$", then the circuit shown in FIG. 32 may be resonated at the sub-carrier frequency $f_{sc}$, so that a large resonant current can be supplied to both the transmission/reception coil 232 and the resonant capacitor 234. Also, this large resonant current can be supplied to either the non-contact IC card 210 or the reader/writer 220. However, in the actual circuit, there are some possibilities that $(1/2\pi)(LC)^{-1/2}$ cannot be made coincident with the carrier frequency $f_r$, because of errors contained in the circuit elements. Therefore, in order to achieve the tuning effect even in such a case, a multiple-turned circuit arranged by a plurality of resonant circuits may be employed, so that the frequency range may be extended.

In the above-explained description, the communication auxiliary apparatus 230 emphasizes and extends the sub-carrier $f_s$, and thus extends the communication distance of the transmission data which is modulated based on this sub-carrier $f_s$. However, while such a communication auxiliary apparatus capable of similarly emphasizing/extending the carrier frequency $f_c$ is combined with the above-described communication system, the original maximum communication distance between the reader/writer 220 and the non-contact IC card 210 may be extended. As a result, even in such a case that a short communication distance of a non-contact information medium such as an on-chip coil IC is used, the present invention may be applied thereto.

While the preferred embodiments according to the present invention have been described in detail, the present invention is not limited to these embodiments, but may be modified, changed, and substituted without departing from the technical scope and spirit of the present invention.

For instance, the non-contact IC module 30 may be constituted as a separatable unit from the booster unit 20. This separatable unit may be mechanically engaged with the reader/writer 1. While maintaining such a condition of the mechanical engagement, the non-contact IC module 30 may directly communicate with the antenna unit 3 in the non-contact manner.

For instance, there are possibilities that since the non-contact information medium 10 transmits/receives the data to/from the reader/writer 1 by using the electromagnetic wave, this data is bugged. There is another possibility. That is, when such an apparatus having a function capable of realizing the reader/writer is positioned close to the non-contact information medium 10 stored in a pocket, this apparatus may communicate with the IC chip 32, so that a value saved in the IC chip 32, for example, an electronic money is stolen. As a consequence, in the case that the non-contact information medium 10 is used in a settlement purpose, while setting the communication distance between the reader/writer 1 and the non-contact information medium 10 to be very short, if the non-contact information medium 10 and the reader/writer 1 are constructed in the close fitting construction, then the system security can be improved.

In accordance with the non-contact information medium of the embodiment of the present invention, the wireless-communicatable non-contact IC module having the communication means such as a very small coil can extend its applicable range where the communication distance may be extended up to a desirable distance by the booster unit.

Also, since the operating performance (such as processing function, storing function, and communicating function) of a single non-contact IC module can be checked before being mounted on the base member (including such a case that this non-contact IC module is molded), the manufacturing efficiency can be improved, for example, as compared with that of the conventional non-contact IC card.

Furthermore, there is a specific advantage that the above-described operating performance of the non-contact IC module can be checked under wafer condition.

Also, since the non-contact IC module may be used in a single form, or a packaged unit, the shape/size thereof may be varied in correspondence with various usage, not only the card form, but also the tag form.

Moreover, in accordance with the non-contact IC module, there is no specific limitation in such an IC module containing at least an IC chip and a communication means such as a coil connected thereto, but also other IC modules containing these IC chip/communication means and further other structural components.

As to the non-contact IC module using both the IC chip and the coil, this coil may be arranged on such a board on which the IC chip is stacked. Alternatively, the coil is formed with the IC chip in an integral form to arrange an on-chip IC. Then, such an on-chip coil IC may be manufactured by the similar manufacturing stage to the IC/package manufacturing stage.

Apparently, the manufacturing method according to the embodiment of the present invention may employ another stage, as previously explained with reference to FIG. 23 and FIG. 24.

Moreover, since the checking method and the system according to the embodiment of the present invention can check the non-contact IC module in the non-contact manner, this checking method can be easily carried out in lower cost, as compared with the normal checking method. Also, there is no risk that the IC is damaged.

In accordance with the communication system and the communication auxiliary apparatus according to one aspect of the present invention, since the communication established between the non-contact information medium and the external appliance can be relayed, even when the non-contact information medium cannot directly communicate with the external appliance but can communicate with the external appliance via this communication auxiliary apparatus, the applicable region can be extended with respect to the non-contact information medium and the user thereof.

Also, in the communication system according to a second aspect of the present invention, the second auxiliary communication auxiliary apparatus can achieve a similar effect.

What is claimed is:

1. A non-contact information medium comprising:

a booster unit having a first coil, capable of wireless-communicating with an external apparatus by utilizing an electromagnetic induction; and an IC (integrated circuit) module capable of communicating with said external apparatus via said booster unit in a non-contact manner in such a way that said IC module includes IC element and a second coil electrically connected and formed integrally with said IC element for transmitting/receiving data to/from said external apparatus through said first coil formed on said booster unit.

2. A non-contact information medium as claimed in claim 1 wherein:

said IC element owns a memory unit.

3. A non-contact information medium as claimed in claim 1 wherein:

said booster unit includes a capacitor provided with such a condition that said capacitor is resonated in combination with said coil at a carrier frequency transmitted by said external apparatus.

4. A non-contact information medium as claimed in claim 1 wherein:

said booster unit is further comprised of a capacitor which constitutes a series-resonant circuit in combination with said first coil.

5. A non-contact information medium as claimed in claim 1 wherein:

said booster unit is further composed of a capacitor which constitutes a parallel-resonant circuit in combination with said first coil.

6. A non-contact information medium as claimed in claim 1 wherein:

said first coil and said second coil are arranged under overlap state in order that a magnetic flux direction of said first coil is made substantially coincident with a magnetic flux direction of said second coil.

7. A non-contact information medium as claimed in claim 1 wherein:

said non-contact information medium is further comprised of a supporting member; said first coil is arranged on one surface of said supporting member; and said second coil is arranged on the other surface of said supporting member in such a manner that said second coil is positioned opposite to said first coil.

8. A non-contact information medium as claimed in claim 1 wherein:

in said non-contact information medium, said second coil is arranged inside said first coil.

9. A non-contact information medium as claimed in claim 1 wherein:

said booster unit is further comprised of:

a third coil for receiving an induction current produced in said first coil and electromagnetically coupled to said second coil.

* * * * *